(12) United States Patent
Yang et al.

(10) Patent No.: US 11,374,973 B2
(45) Date of Patent: Jun. 28, 2022

(54) STREAMLINING CRYPTOGRAPHIC PROCESSES IN A TEST ENVIRONMENT

(71) Applicant: Spirent Communications, Inc., San Jose, CA (US)

(72) Inventors: Li Yang, Plano, TX (US); Suma Subbarao, McKinney, TX (US); Scott Wayne Parcel, Cupertino, CA (US); Jurrie Van Den Breekel, Thousand Oaks, CA (US); David Gary DeSanto, Plano, TX (US)

(73) Assignee: Spirent Communications, Inc., San Jose, CA (US)

( * ) Notice: Subject to any disclaimer, the term of this patent is extended or adjusted under 35 U.S.C. 154(b) by 513 days.

(21) Appl. No.: 16/228,714

(22) Filed: Dec. 20, 2018

(65) Prior Publication Data

US 2020/0204591 A1 Jun. 25, 2020

(51) Int. Cl.
*H04L 9/00* (2022.01)
*H04L 9/40* (2022.01)

(52) U.S. Cl.
CPC .......... *H04L 63/16* (2013.01); *H04L 63/0428* (2013.01)

(58) Field of Classification Search
CPC ..... H04L 63/16; H04L 63/0428; H04L 43/04; H04L 63/166; H04L 67/02; H04L 63/061
See application file for complete search history.

(56) References Cited

U.S. PATENT DOCUMENTS

| 5,995,753 | A  | 11/1999 | Walker |
| 6,252,891 | B1 | 6/2001  | Perches |
| 6,463,565 | B1 | 10/2002 | Kelly et al. |
| 6,654,701 | B2 | 11/2003 | Hatley |

(Continued)

FOREIGN PATENT DOCUMENTS

WO 2017053961 A1 3/2017

OTHER PUBLICATIONS

Rescoral, E., The Transport Layer Security (TLS) Protocol Version 1.3. Internet Engineering Task Force (IETF) Request for Comments #8446, Aug. 2018.

(Continued)

*Primary Examiner* — Brandon Hoffman
*Assistant Examiner* — Helai Salehi
(74) *Attorney, Agent, or Firm* — Haynes Beffel & Wolfeld LLP; Andrew Dunlap

(57) ABSTRACT

The technology disclosed is a method of testing handling of secure communication sessions of clients with servers by device or system under test (DUT). The method includes (i) establishing a secure communication session between the client and the server while the client and the server transitions past a standards-required verification step or validation step without performing the required verification or validation, (ii) establishing a secure communication session between the client and the server while the client and the server reuse standards-required security mechanisms without generating or obtaining new standards-required security mechanisms, or (iii) establishing a secure communication (Continued)

session between the client and the server while the client and the server generate and transmit content contrary to an established standard-based procedure that poses certain requirements of the content.

26 Claims, 10 Drawing Sheets

(56) References Cited

U.S. PATENT DOCUMENTS

| | | | |
|---|---|---|---|
| 6,728,929 B1 | 4/2004 | Luong | |
| 7,016,340 B1 | 3/2006 | McKinion | |
| 7,158,907 B1 | 1/2007 | Soldo | |
| 7,162,377 B2 | 1/2007 | Amrod et al. | |
| 7,181,360 B1 | 2/2007 | Nikolac et al. | |
| 7,272,114 B1 | 9/2007 | Barkan | |
| 7,647,219 B2 | 1/2010 | Overturf et al. | |
| 7,826,381 B1 | 11/2010 | Kastuar et al. | |
| 8,649,275 B2 | 2/2014 | Pyatkovskiy et al. | |
| 8,996,920 B2 | 3/2015 | Fattah | |
| 9,330,227 B1 * | 5/2016 | Han | G06F 30/398 |
| 10,287,811 B1 * | 5/2019 | Arimoto | E05D 15/165 |
| 2002/0144015 A1 | 10/2002 | Lortz | |
| 2003/0016819 A1 | 1/2003 | Cheng | |
| 2004/0190519 A1 | 9/2004 | Dugatkin | |
| 2004/0240440 A1 | 12/2004 | Wild et al. | |
| 2006/0039538 A1 | 2/2006 | Minnis et al. | |
| 2006/0045021 A1 | 3/2006 | Deragon et al. | |
| 2008/0031151 A1 | 2/2008 | Williams | |
| 2008/0198742 A1 | 8/2008 | Kaempfer | |
| 2009/0089863 A1 | 4/2009 | Vanniarajan | |
| 2010/0061378 A1 | 3/2010 | Joyner et al. | |
| 2010/0269044 A1 | 10/2010 | Ivanyi et al. | |
| 2011/0214157 A1 | 9/2011 | Korsunsky et al. | |
| 2012/0182884 A1 * | 7/2012 | Pyatkovskiy | H04L 63/166 370/250 |
| 2013/0010602 A1 * | 1/2013 | Ramanath | H04L 67/08 370/241 |
| 2013/0138827 A1 | 5/2013 | Loach | |
| 2013/0346719 A1 | 12/2013 | Tomlinson et al. | |
| 2017/0163693 A1 | 6/2017 | Skuratovich et al. | |
| 2017/0208560 A1 | 7/2017 | Papa et al. | |
| 2017/0263332 A1 | 9/2017 | Kapoor | |
| 2018/0176020 A1 | 6/2018 | Mukhopadhyay | |
| 2019/0182127 A1 * | 6/2019 | Pignataro | H04L 41/0853 |
| 2019/0182129 A1 * | 6/2019 | Canady | H04L 67/141 |

OTHER PUBLICATIONS

Dierks, T. et al., The Transport Layer Security (TLS) Protocol Version 1.2, Network Working Group Request for Comments: 5246, Aug. 2008.

Flueler, Linus. Finite State Machine and Multithreading using NET. Mar. 2, 2006. 7 pages, http://www.codeproject.com/Articles/5540/Finite-State-Machine-and-Multithreading-using-NET.

Lte. 3GPP TS 36.523-1 V8.1.0. 3GPP Technical Specification. Mar. 2009. 666 pages.

Spirent Communications: Inspired Innovation, Reference Manual: Spirent TestCenter System, Aug. 2006, pp. 1-134.

U.S. Appl. No. 12/131,944—Notice of Allowance dated Feb. 12, 2010, 9 pages.

U.S. Appl. No. 13/656,397—Notice of Allowance dated Jun. 25, 2020, 6 pages.

U.S. Appl. No. 13/656,397—Office Action dated Aug. 7, 2014, 4 pages.

U.S. Appl. No. 13/656,397—Notice of Allowance dated Nov. 21, 2014, 13 pages.

U.S. Appl. No. 13/656,397—Response to Office Action dated Aug. 7, 2014, filed Nov. 4, 2014k, 9 pages.

U.S. Appl. No. 15/838,047—Office Action dated Nov. 29, 2019, 30 pages.

U.S. Appl. No. 15/838,047—Response to Office Action dated Nov. 29, 2019, filed Apr. 29, 2020, 16 pages.

U.S. Appl. No. 15/838,047—Final Office Action dated Sep. 18, 2020, 32 pages.

U.S. Appl. No. 15/838,047—Response Final Office Action dated Sep. 18, 2020, filed Dec. 17, 2020, 17 pages.

U.S. Appl. No. 15/838,047—Notice of Allowance dated Mar. 19, 2021, 9 pages.

* cited by examiner

STREAMLINING CRYPTOGRAPHIC PROCESSES IN A TEST ENVIRONMENT

RELATED APPLICATION(S)

This application is related to: (i) U.S. Pat. No. 8,996,920, issued on Mar. 31, 2015 and entitled "FINITE STATE MACHINE METHOD FOR TEST CASE GENERATION AND EXECUTION OF COMMUNICATION PROTOCOLS"; (ii) U.S. Pat. No. 7,826,381, issued on Nov. 2, 2010 and entitled "METHOD AND DEVICE TEST DATA STREAMS BOUND TO EMULATED DEVICES"; and (iii) U.S. application Ser. No. 15/838,047 filed on Dec. 11, 2017 and entitled "METHOD AND SYSTEM FOR INDUCING PSEUDO HTTPS COMMUNICATIONS BETWEEN ONE OR MORE EMULATED SERVERS AND EMULATED CLIENTS TO TEST A DEVICE THEREBETWEEN". The related applications are incorporated by reference.

FIELD OF THE INVENTION

The technology disclosed relates to testing a device or system under test (DUT) located between emulated servers and clients. Particularly, the technology disclosed relates to streamlining cryptographic and other types of secure handshakes and/or how they are generated and consumed, as well as other communications generated by the emulated servers and clients while communicating through the DUT.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Switching devices, bridging devices, routing devices, firewalls, security gateway devices, proxy servers, secure remote access (SRA) devices and deep packet inspection devices, etc., must be thoroughly tested before they are placed in the market. Hereinafter, these devices are referred to as devices or systems under test or secured devices or systems under test and abbreviated as a DUT. For example, DUTs must be tested in real world conditions in order to measure throughput capabilities, reliability, etc. In particular, such DUTs, which are typically installed in high volume infrastructures, must be capable of handling high amounts of data throughput while maintaining functionality that provides additional security and inspection. It is critical that these devices provide a high level of performance. As a result, such DUTs are typically put through the rigors of intensive laboratory testing before being placed in the market. Furthermore, such DUTs may undergo such intensive testing while they are in the field if damage is suspected, as a result of something like a power surge.

With the advent of the Secure Sockets Layer (SSL), the Transport Layer Security (TLS) protocol and other security protocols that require cryptographic handshakes and other security measures, there has been a need to test devices (DUTs) that support secured communications between servers and clients. One particular type of secure communications is HTTPS, which is often referred to as "secure" HTTP. The HTTP is secure because data transmissions are encrypted using the SSL or TLS protocols. The SSL protocol is the early version of security that was required by HTTPS and the TLS protocol is the more recent version of security required by HTTPS. Other types of secure communications that are implemented to test secure communications devices can include secure internet protocol (IPSec), secure email protocols, such as pretty good privacy (PGP) protocol and secure/multipurpose internet mail extensions (S/MIME), domain name system security extensions (DNSSEC), and secure socket shell (SSH) to name a few. Hereinafter, the establishment of communications and further use of communications using these various security protocols, and others, are referred to as secure communications, unless specific examples of communications are specified, such as HTTPS.

Conventionally, in order to test secure communications devices (DUTs) that communicate data between servers and clients, the servers and clients must establish secure communication sessions and then transmit packets that satisfy the particular communication protocol. The servers and clients that communicate through the DUTs being tested can be emulated or they can be actual/physical servers and clients. With the throughput capabilities of modern devices under test it is more reasonable to use emulated servers and clients. It would be unrealistic to have the number of actual/physical servers and clients in the laboratory that would be necessary to push the devices under test to their limits.

The establishment of these secure communication sessions between servers, clients and DUTs require cryptographic handshakes and communications, such as those used in HTTPS and other encrypted communications, which necessitate the utilization of a number of computationally and logically demanding operations as part of preparing a secure channel for communication and as part of performing actual encrypted communications of primary payloads.

The secure communication sessions or secure channels are established between two end-points (server and DUT; client and DUT; or client and server through the DUT) by implementing various handshake mechanisms to announce the capabilities of both sides of a channel, and for each site to establish trust that they are communicating with who they are expecting to communicate with (including anonymous endpoints). This ensures that communications are not subject to an unknown or unapproved person-in-the-middle interceptions, alterations, or participations in the communications. Public key cryptography is often used as part of the handshake procedure to both advertise a way to send encrypted information to a publisher of a certificate or key, and to "sign" content in a way that can prove that the content is from the publisher of the certificate or key. Additionally, hashing mechanisms, such as message digest algorithm 5 (MD5) and secure hashing algorithm (SHA), can be used as part of preventing communicated content from being tampered with without detection. Furthermore, dynamically generated unique keys are also commonly part of these security mechanisms. These various mechanisms used to establish and maintain trust between legitimate communicating parties are critical to secure communications, and failing to comply with specific standards for generating, sending, receiving, and verifying elements of these handshakes can result in failures in the handshake process, as well as the security/privacy of the channel established.

As a specific example, the HTTPS protocol requires very specific data exchange transactions to take place before a HTTPS session can be established. This is typically referred to as HTTPS handshaking, which is performed in order for the servers and clients to negotiate encryption protocols, levels and exchange keys and certificates. Once the handshaking is complete, the servers and clients will exchange encrypted data through the DUT. An example of an encrypted HTTPS session would be a consumer logging into their bank account. Some of the initial communications between the user's computer and the bank servers are not encrypted, as they are performing the handshaking. Once the handshaking is complete, the user's credentials (i.e., login and password) are encrypted, then communicated to the server and then decrypted.

The generation and validation or verification of the various messages, keys, certificates and hashes that are used during the HTTPS handshaking and subsequent communications, along with the encrypting and decrypting are processor intensive and take time. In the real world, these processor intensive and time-consuming procedures are a necessary tradeoff for the added level of security. However, when testing a DUT in a testing environment, processing power and time are valuable commodities and the more power and time consumed, the longer it takes to run a complete test on the DUT. With constrained test resources, security protocols can make it impractical to generate test loads of desired magnitudes.

Therefore, a clear need arises for a method and system for optimizing cryptographic and other types of secure handshakes as well as other communications generated by the emulated servers and clients through the DUT.

SUMMARY

Aspects of the present disclosure are to address at least the above-mentioned problems and/or disadvantages and to provide at least the advantages discussed above and further described below. Applicant has found that, in some test environments, true security of the established channels between the clients and servers is not a strict requirement. For example, in a 2-arm testing environment where the tester is in control of both the server and the client, when true security of the communicated content is not a true requirement in these test contexts, it is possible to conduct observably realistic handshakes for secure channel setup, but to avoid some computationally demanding internal operations without sacrificing test realism. Examples of such avoidable operations, in some test contexts, include verification or validation of content, such as signed or hashed content. If there is no risk of tampering, person-in-middle, or other attacks in the test environment, these real-world verifications are both unnecessary and have no impact on test realism, and cannot be detected by devices being tested.

Additionally, in some test contexts, other elements of standards for handshakes, including suitable unique keys, proper signing, and proper hashing and hash algorithms, may not be discernable or important to the network devices being tested, and therefore an opportunity for computational savings by select non-compliance with the applicable standards arises. The savings of selected non-compliance with applicable standards is not limited to the computational costs of the handshake processing itself. For example, manipulation of the handshakes to force reuse of symmetric keys that normally should be new and unique, can allow for reduction of symmetric encryption/decryption computation.

These optimization techniques for time and computations savings can be classified into at least three categories, including the client and/or server (i) transitioning past a standards-required verification step or validation step without performing the required verification or validation, (ii) reusing standards-required security mechanisms, such as certificates and keys, without generating or obtaining new standards-required security mechanisms and (iii) generating and transmitting content that is contrary to an established standard-based protocol that imposes certain requirements of the content. Consumption of time and compute cycles when establishing secure communications in a testing environment between a plurality of clients, a plurality of servers, including real and/or emulated clients and servers, and a DUT is reduced by optimizing cryptographic and other types of secure handshakes as well as other communications.

Particular aspects of the technology disclosed are described in the claims, specification and drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 1:
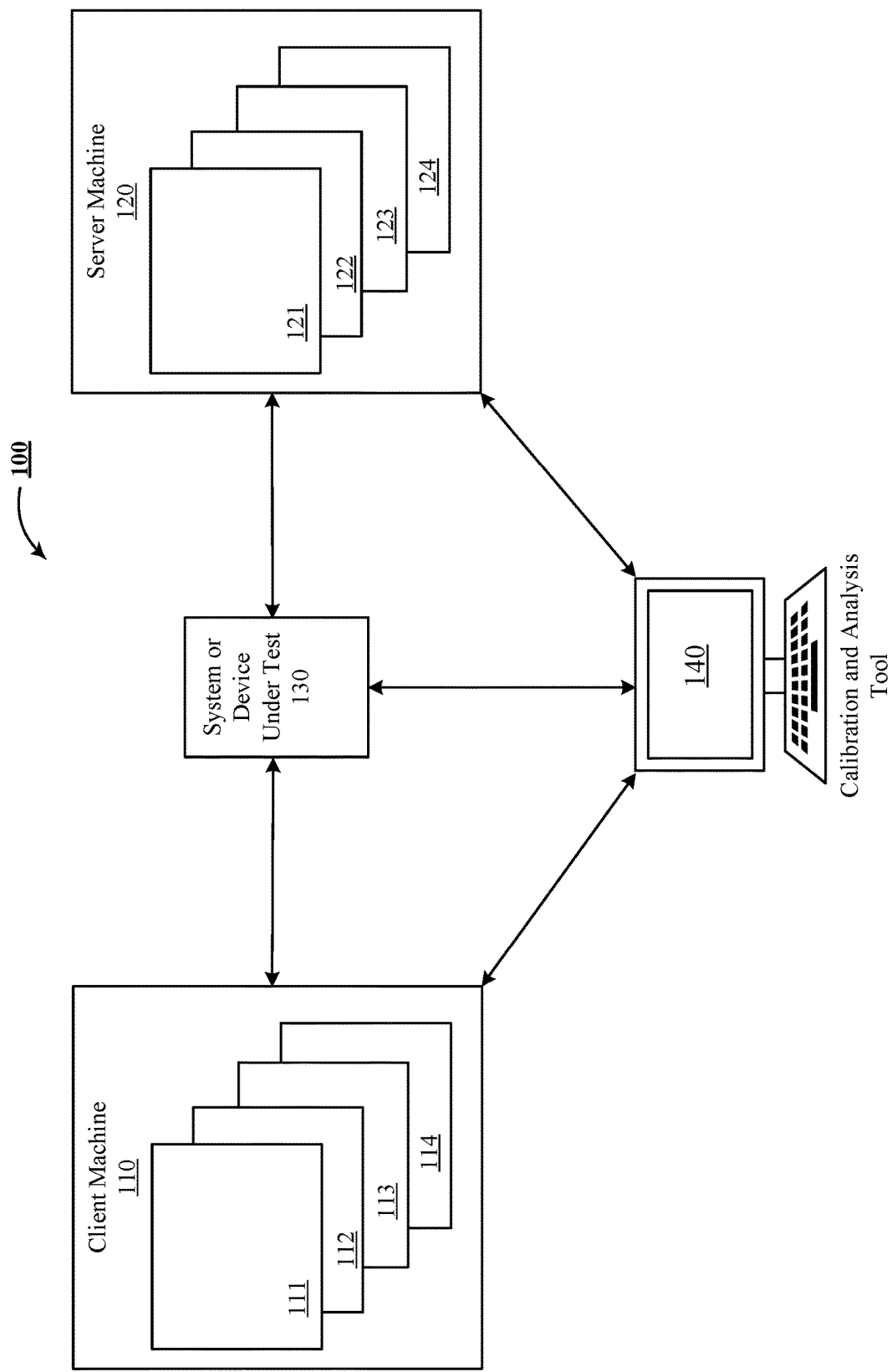
FIG. 1 illustrates a test system for testing a system or device under test ("DUT") that sits between a plurality of client state machines running on a client machine and a plurality of server state machines running on a server machine.

FIG. 1 illustrates a test system for testing a system or device under test ("DUT") that sits between a plurality of client state machines running on a client machine and a plurality of server state machines running on a server machine. Referring to FIG. 1, a test system 100 is illustrated, and includes a client machine 110, a server machine 120 and a calibration and analysis tool 140. These components of the test system 100 are for testing the "System or Device" under test, hereinafter referred to as the DUT 130.

The DUT 130 can be any device that is capable of passing information between a server and a client, a client and a client, or a server and a server. Typically, the DUT 130 will be a switching device, a bridging device, a routing device, a security device, or any of the aforementioned types of devices and/or systems under test. Using the technology disclosed in the present application, the test system 100 establishes and negotiates secure communication sessions, such as HTTPS sessions, between the client machine 110 and the server machine 120 in order to test the throughput and reliability of the DUT 130. As mentioned above, secure communications is HTTPS and other types of secure communications include, but are not limited to, secure internet protocol (IPSec), secure email protocols, such as pretty good privacy (PGP) protocol and secure/multipurpose internet mail extensions (S/MIME), domain name system security extensions (DNSSEC), and secure socket shell (SSH). When referring to HTTPS, for example, the optimization techniques described herein are not limited to only HTTPS, as they can be applied to all types of secure communications described herein as we as others that would be apparent to a person of ordinary skill in the art. These secure communications can be implemented to comply with SSL or TLC protocols. The term "secure communication," as used throughout this disclose can be referring to any of these above-mentioned types of communications and/or protocols, as well as other types of communications and protocols not listed here.

While data is being transmitted through the DUT 130, the DUT 130 itself can be performing deep packet inspection (DPI) of the data as it passes through the DUT 130, when the DUT terminates secure connections with the client and server. The DPI will typically performed after the handshaking process (e.g., the second phase, as described below with reference to FIG. 2, as opposed to during the first phase) and can be performed on the header and/or the payload of the packet received by the DUT 130. DPI is a type of computer network packet filtering that examines at least the data part of a message as it passes through an inspection point (i.e., the DUT 130) searching for protocol non-compliance, viruses, spam, intrusions, or defined criteria to decide whether the message may pass or if it needs to be routed to a different destination, suppressed, or, for the purpose of collecting statistical information at the Application layer of the Open Systems Interconnection model (OSI). For example, a firewall running on the DUT 130 can perform the DPI on the data packets as they pass between the client machine 110 and the server machine 120. Other aspects of the firewall can also be tested using the test system 100.

Both the client machine 110 and the server machine 120 can include hardware and software that implement features described herein. The client machine 110 and the server machine 120 may include one or more of logic arrays, memories, analog circuits, digital circuits, software, firmware and processors such as microprocessors, field programmable gate arrays (FPGAs), coarse grained reprogrammable arrays (CGRAs), graphic processing units (GPUs), application-specific integrated circuits (ASICs), programmable logic devices (PLDs) and programmable logic arrays (PLAs). The hardware may be found in the chassis, card rack or integrated unit. It may include a specifically programmed and/or customized general-purpose computer that is capable of communicating with the DUT 130. Both the client machine 110 and the server machine 120 may include a number of separate units that are clustered together or remote from one another.

Specifically, in an implementation, each of the client machine 110 and the server machine 120 can include a processor with at least one core, but could include at least four cores and could each include two processors, each having 16 cores. An implementation of the client machine 110 and the server machine 120 can also include 512 GB of Random-Access Memory (RAM) or more.

The client machine 110 can reasonably emulate about 10 million clients, each having multiple secure connections. In reasonably foreseeable implementations, with increasingly powerful hardware, it would not be unreasonable to emulate up to 50 million secure client connections at a given time. Multiple client machines can be used in a coordinated test to emulate 300 million to 500 million or more secure connections, even coordinating a dozen or more client machines. These "clients" can be emulated using finite state machines (FSMs), which are described in more detail below or stateless machines that implement or replay packet captures. In FIG. 1, the client machine 110 is executing client state machine 111, client state machine 112, client state machine 113 and client state machine 114. This is only an example and many more state machines can be executed. Each client state machine, as executed can represent an emulated client.

The server machine 120 can reasonably emulate about five servers, but should be capable of emulating hundreds of thousands or even millions of servers. Typically, the emulation of five servers is sufficient to establish secure communication sessions with one million or more clients. Just like the "clients," the "servers" are emulated using a FSM. In FIG. 1, the example server machine 120 is emulating server state machine 121, server state machine 122, server state machine 123 and server state machine 124.

The calibration and analysis tool 140 can be hardware used for the client and/or server machine, a standard desktop computer, a laptop computer, any other type of portable computing device that is capable of connecting to at least one of the client machine 110, the server machine 120 and the DUT 130. The calibration and analysis tool 140 may also be a customized computing device running customized software. The calibration and analysis tool 140 can be capable of configuring the client machine 110, the server machine 120 and/or the DUT 130 and can monitor throughput and/or security effectiveness of the DUT 130 (or performed by other devices or software) while the data packets are being transmitted between the client machine 110 and the server machine 120.

The results of the test (e.g., a stress test) being conducted on the DUT 130 can be collected by or delivered to the calibration and analysis tool 140, as well as the client machine 110 and the server machine 120. Some or all of the functionality of the calibration and analysis tool 140 can be performed by the client machine 110 and/or the server machine 120.

While FIG. 1 merely illustrates three connections to the DUT 130, it is possible to connect the client machine 110 to many ports or interfaces of the DUT 130 as well as connect the server machine 120 to many ports or interfaces of the DUT 130. The DUT 130, for example, have a separate port or ports that handle ingress and a separate port or ports that handle egress, or there can be a set of ports that handle both ingress and egress. The same is also possible for the calibration and analysis tool 140. Examples of port or interface types include IP, Multiprotocol label switching (MPLS) and Ethernet interfaces. Examples of interface configurations include IPv4, IPv6, MPLS, Ethernet, virtual local-area network (VLAN), generic routing encapsulation (GRE), backbone service instance tag (I-TAG), layer two tunneling protocol (L2TP)(v2/3), point-to-point protocol (PPP), point-to-point protocol over X (PPPoX), worldwide interoperability for microwave access (WiMax), high-level data link control (HDLC), ATM adaption layer 5 (AAL5), point of sale (POS), internet protocol security (IpSec), media access security (MacSec) (802.1ae, 802.1af), and Fiber Channel. These interface types and interface configurations can be setup and/or determined using interface configuration information that is available from the test system 100 and/or the DUT 130.

The interface configuration information depends on the interface type. For IPv4 or IPv6, the interface configuration includes a static or dynamic IP address of the emulated device and a static or dynamic gateway IP address. For the MPLS interface, the interface configuration includes at least one MPLS label. For a PPPoE or PPPoEoA interface (collectively allows with related variants, "PPoX"), the interface configuration includes at least a session ID. For the Ethernet interface, the interface configuration includes at least a MAC address. Some of this interface configuration information is supplied dynamically using a setup protocol. For IPv4 or IPv6 configuration, the set-up protocol for a dynamic IP address may be DHCP or PPP. For the MPLS configuration, the setup protocol for an MPLS label may be LDP. For other interfaces, which have interface address configurations that are dynamically learned using interface set up protocols, the method exercises, as appropriate to the interface, one or more of PPPoX, L2TP, WiMax, IpSec, MacSec, or Fiber Channel. According to a further aspect of the method, the device configuration received for the test device and the DUT to set up network connectivity may be one or more industry standard routing or switching protocols known as STP (and its variants), OSPF, RIP, BGP, LDP, BFD, EOAM, IS-IS, LACP, PIM, RSVP.

Essentially, the test system 100 is configurable on many levels and is capable of interfacing with a DUT 130, and any other devices chained with the DUT (not illustrated) using any of the interfaces and protocols from the OSI layers (i.e. layers 1-5) that are below, for example, the HTTPS layers (i.e., layers 6 and 7).

Once the client machine 110, the server machine 120, the DUT 130 and the calibration and analysis tool 140 have been set up to run the "test," it will be necessary to start establishing secure communication sessions between the various emulated clients and the various emulated servers. The "test" can be run in a laboratory type environment. However, the "test" could also be performed in the field for the purpose of determining whether a DUT deployed in the field has been damaged, needs replacement or repair, or meets duty requirements.

Figure 2:
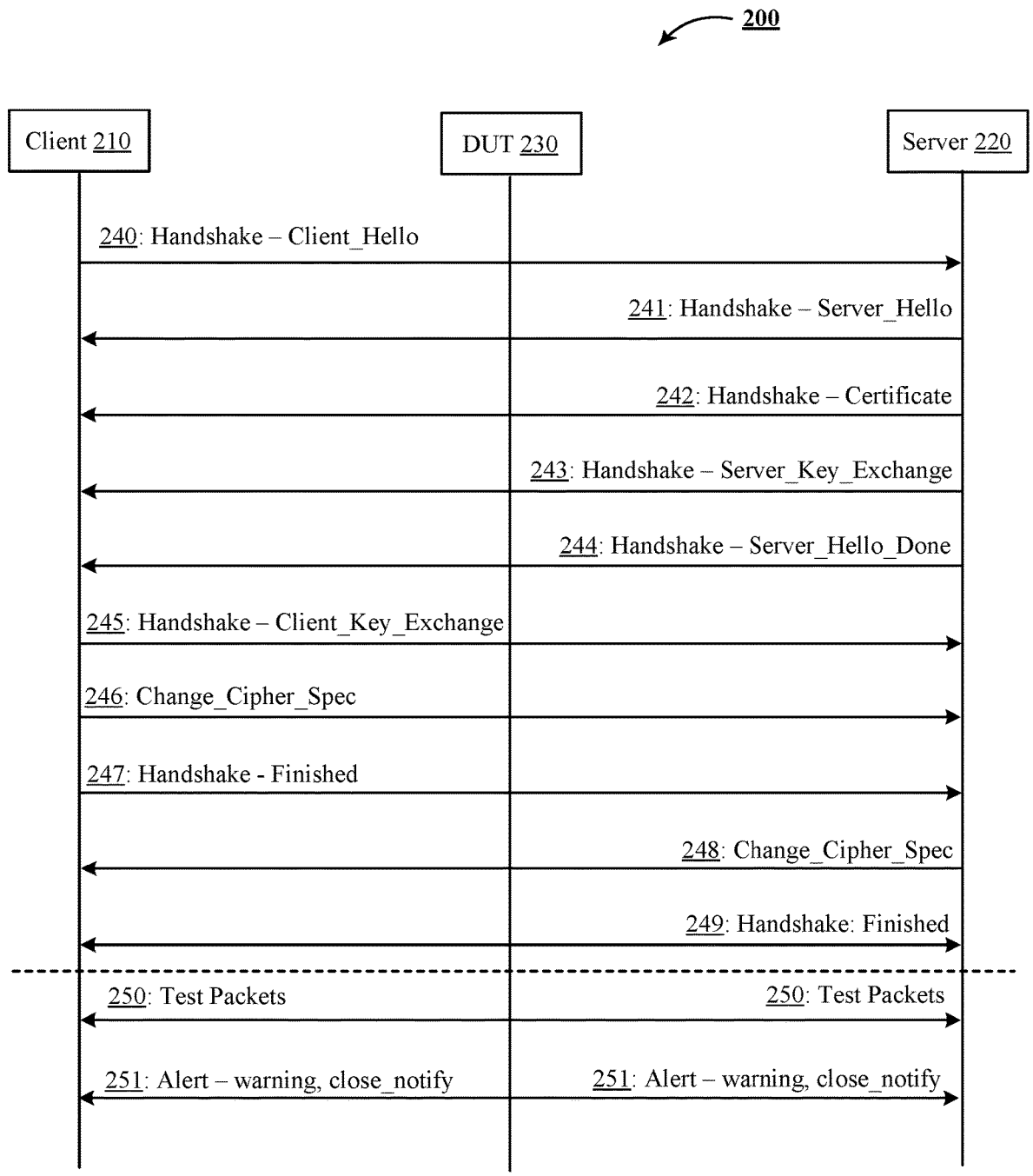
FIG. 2 illustrates a typical handshaking procedure between a client and a server, and through a DUT and an optimized testing procedure of transmitting test packets.

FIG. 2 illustrates a typical handshaking procedure between a client and a server, and through a DUT, without the implementation of the optimization provided by the technology disclosed. FIG. 2 also illustrates the optimized testing procedure of transmitting packets, as described in U.S. application Ser. No. 15/838,047, which is incorporated herein by reference.

FIG. 2 illustrates a message flow between a client and a server, and through a DUT according to an embodiment of the present disclosure. Referring to FIG. 2, a data flow 200 between a client 210, a DUT 230 and a server 220 is illustrated.

This data flow 200 illustrated in FIG. 2 is similar to the HTTPS data flow outlined in RFC 2446, RFC 2817, RFC 2818, RFC 5246 and RFC 8466. Specifically, RFC 5246 describes the process for establishing a TLS session (e.g., an HTTPS session) between a server and a client. An HTTPS session is commonly described as having two phases. The first phase includes establishing a secure connection. In FIG. 2, the first phase covers operations 240 through 249 (i.e., the first phase take place above the dotted horizontal line in FIG. 2). The second phase includes sending and receiving encrypted data. In FIG. 2, the second phase covers operations 250 and 251 (i.e., the second phase takes place below the dotted horizontal line in FIG. 2). Note that during typical HTTPS sessions, in the second phase, the headers of the data packets are not encrypted, only the payload (e.g., application data) is encrypted. As briefly described in the BACKGROUND section, HTTPS is a secure session between a client and one or more servers. Initially unencrypted information is exchanged back and forth between the client and server in order to establish the HTTPS session, and then, traditionally, all of the data (i.e., application data) that is transmitted between the client and the server is encrypted using the previously negotiated encryption protocols.

In order to establish an HTTPS session, the client 210 will transmit, in operation 240, an initial handshake, also known as "Client_Hello" to the server 220. The client 210 is one of many clients emulated on the client machine 110 of FIG. 1 and the server 220 is one of many servers emulated on the server machine 120. The "Client_Hello" message may include a session ID, as well as other information required by the HTTPS protocol. For example, the "Client_Hello" message may include information regarding which types of Key the client 210 can accept (e.g., RSA, Diffie-Hellman, DSA, etc.), which type of Cipher the client can accept (e.g., RC4, Triple DES, AES, etc.) and which type of Hash can be used (e.g., HMAC-MD5, HMAC-SHA, etc.).

Once the server 220 receives the "Client_Hello" message, it will respond with its own handshake message "Server_Hello" in operation 241. Just like the "Client_Hello" message, the "Server_Hello" message may include additional information, such as a session ID. The "Server_Hello" message may also indicate which type of Key, Cipher and Hash will or can be used by the server 220. DUTs that terminate secure connections with clients and servers have different modes of handling text to be combined with a base key to generate a final encryption key. The added text is exchanged as part of the handshake. Some DUTs select their own added text for their secure connections with the client and host. Other DUTs pass through this added text, sometimes called a salt. For DUTs that pass through the added text, a test can reuse previously encrypted content, even though the DUT terminates the connection.

The server 220 continues the handshaking procedure by sending a Certificate in operation 242, a "Server_Key_Exchange" message in operation 243 and a "Server_Hello_Done" message in operation 244. The Certificate can identify, for example, a serial number, an issuer (e.g., Verisign), validity dates, a public key, as well as a site address, and a company address.

After receiving the Certificate, the "Server_Key_Exchange" and the "Server_Hello_Done" messages, the client 210 will essentially say, ok, let's start encrypting. This is accomplished by the client 210 sending, as a handshake, a "Client_Key_Exchange" message in operation 245, a "Change_Cipher_Spec" in operation 246 and, as a handshake, a "Finished" message in operation 247. From the "Client_Key_Exchange" message the server 220 will receive a key and both the client 210 and server 220 will be able to calculate a master secret code and from the "Change_Cipher_Spec" message. The server 220 now knows to start using a specific Cipher. Note that many different types of key exchanges can be used for different types of encryption and decryption. For example, the different types of algorithms and encryption/decryption can include symmetric algorithms that use a single key, and asymmetric algorithms that use a public/private key pair. What is important is that both the server 220 and the client 210 negotiate and exchange the correct information in order to able to establish the HTTPS session.

In operation 250, the client 210 and the server 220 exchange "test packets" therebetween. In typical HTTPS communications, once encryption is negotiated (see operations 240-249), subsequent communications between the client 210 and the server 220 can include (i) an unencrypted header, (ii) an encrypted command, such as GET or POST, and (iii) encrypted data that is encrypted using the negotiated encryption method.

However, this operation performed by the technology disclosed is different from typical HTTPS communications, because the "data" in the test packets is not dynamically encrypted or encrypted using a light weight encryption that requires less than half of the resources required for standards-compliant HTTPS communications. A previously encrypted message can be inserted into the payload and used for testing, without any dynamic, real time encryption. As previously described, this lack of encryption of the data allows the finite state machine that is emulating the server 220 and the finite state machine that is emulating the client 210 to receive and respond to messages much faster, because there is actually no encryption or decryption taking place. This is an efficient to test HTTPS connection capabilities of the DUT 130 without actually performing any encryption or decryption. Both the server 220 and the client 210 know that they are running in a mode so that the receipt of an encrypted payload is not expected. The finite state machines of the server 220 and the client 210 just generate the header information and the payload data based on their respective states. The speed increase and data throughput of the test system 100 can be increase by 5 to 10 fold or perhaps even 100 fold or more by eliminating the encryption and decryption steps.

The headers from the test packets exchanged between the server 220 and the client 210 still include meaningful information for the routing of the test packets and for data analysis of the test. Alternatively, the test system 100 may implement a lower level of encryption than that which was negotiated during the first phase of the HTTPS session. While this will not completely alleviate the need for the server 220 and the client 210 to perform encryption and decryption, it will still reduce the level of resources necessary to perform the level of encryption and decryption that was negotiated between the client 210 and the server 220. The contents of these test packets and how the test packets are generated are discussed in further detail below.

Figure 3A:
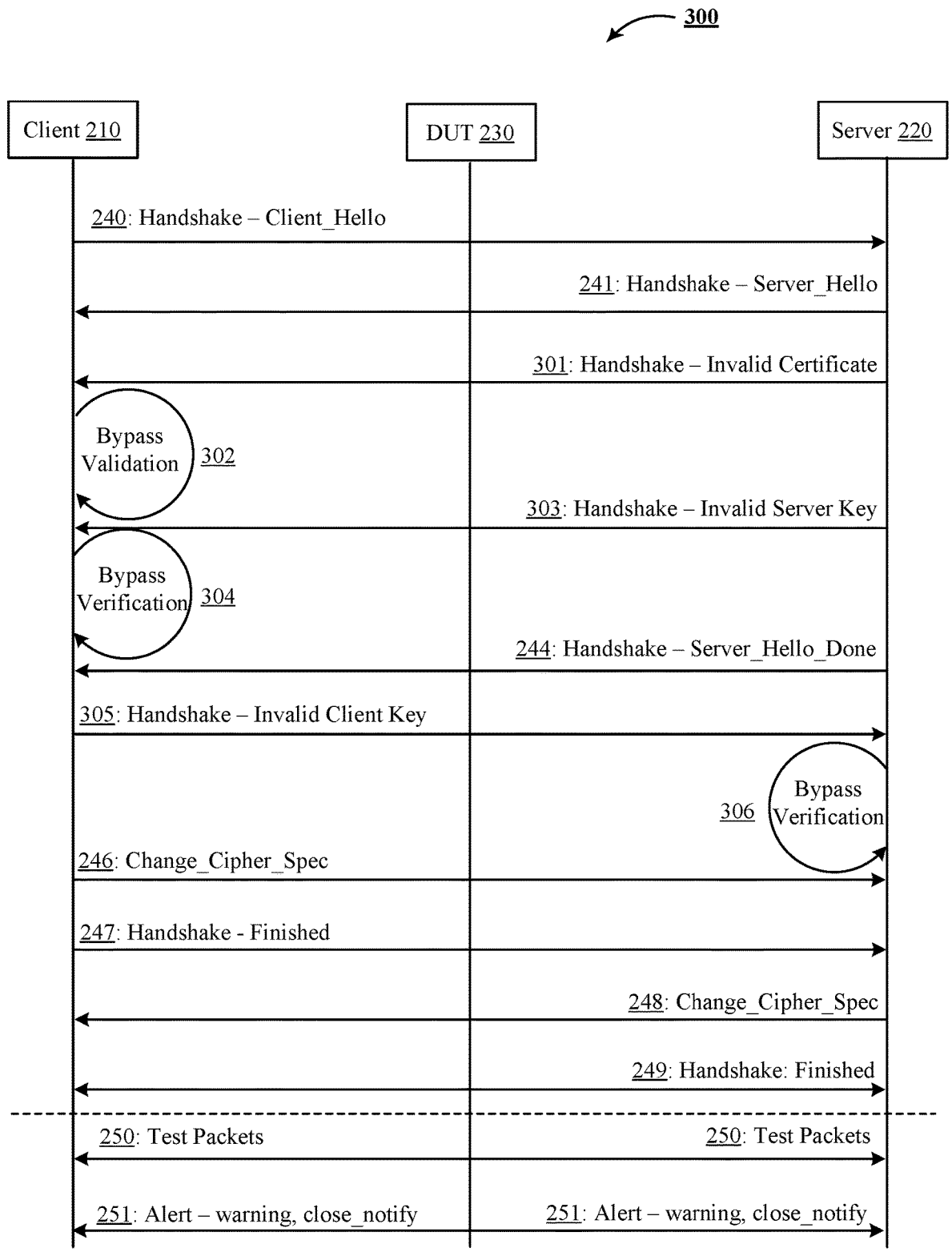
FIG. 3A illustrates at a high level a message flow (between a client and a server, and through a DUT) that bypasses standards-required validation and verification steps according to an embodiment of the present disclosure.

FIG. 3A illustrates a message flow (between a client and a server, and through a DUT) that bypasses standards-required validation and verification steps according to an embodiment of the present disclosure. Before describing the specifics of bypassing the standards-required validation and verification steps, it is noted that generally, the secure communications between the server and client through the DUT can be categorized as (i) internal verifications or validations that are not observable to the DUT, (ii) "encrypted" communications (e.g. non-DUT terminated) that are not observable to the DUT and (iii) communications that are observable but irrelevant to the DUT. Each of these categories can be optimized in a different manner and are explained in further detail with respect to FIGS. 3A-3C.

Referring to FIG. 3A, a data flow 300 between a client 210, a DUT 230 and a server 220 is illustrated. Operations 240 and 241 of FIG. 3A are the same as explained above with reference to FIG. 2. Operation 301 involves the server 220 transmitting an invalid certificate to the client 210. The certificate may be invalid for one of many reasons for the purpose of optimizing the setup of the secure communication session. For example, the certificate may be a nearly-empty certificate that does not include the type of information a valid certificate would include. Such a certificate would reduce the amount of data transmitted between the server 220 and the client 210. Or the certificate could simply be an expired certificate is continually reused for the purposes of establishing a secure communication session in this testing environment.

In operation 302 the client 210 bypasses the validation of the certificate and continues to operate as if the certificate is valid. In other words, the client 210 transitions past a standards-required verification step or validation step without performing the required verification or validation. The server 220 may also perform the same or a similar operation on its end.

Before moving on to the description of operation 303, the present disclosure provides several examples below of specific RFC requirements that can be "bypassed" in order to optimize the establishing of secure communication sessions in this testing environment. The examples provided below are taken from RFC 8466, which is for TLS version 1.3. Note that these are only examples of one particular type of standards-required verifications and that the technology disclosed is capable of optimizing communications in a testing environment for previous and future versions of TLS as well as any other communications protocols. Additionally, note that the examples below only reproduce relevant portions of particular RFC 8466 messages. The example RFC messages and requirements are as follows:

RFC 8466, Section 4.2.8. Key Share:

"Upon receipt of this extension in a HelloRetryRequest, the client MUST verify that (1) the selected_group field corresponds to a group which was provided in the 'supported_groups' extension in the original ClientHello and (2) the selected_group field does not correspond to a group which was provided in the 'key_share' extension in the original ClientHello. If either of these checks fails, then the client MUST abort the handshake with an 'illegal_parameter' alert. Otherwise, when sending the new ClientHello, the client MUST replace the original 'key_share' extension with one containing only a new 'KeyShareEntry' for the group indicated in the selected_group field of the triggering 'HelloRetryReques'. The client MUST verify that the selected NamedGroup in the ServerHello is the same as that in the 'HelloRetryRequest'."

RFC 8466, Section 4.2.8.1. Diffie-Hellman Parameters:

"Peers MUST validate each other's public key Y by ensuring that 1<Y<p-1."

RFC 8466, Section 4.2.8.2. ECDHE Parameters:

"For the curves secp256r1, secp384r1, and secp521r1, peers MUST validate each other's public value Q by ensuring that the point is a valid point on the elliptic curve."

RFC 8466, Section 4.2.11. Pre-Shared Key Extension:

"Clients MUST verify that the server's selected identity is within the range supplied by the client, that the server selected a cipher suite indicating a Hash associated with the PSK, and that a server 'key_share' extension is present if required by the ClientHello 'psk_key_exchange_modes' extension. If these values are not consistent, the client MUST abort the handshake with an 'illegal_parameter' alert."

RFC 8466, Section 4.4.2.4. Receiving a Certificate Message:

"In general, detailed certificate validation procedures are out of scope for TLS (see [RFC5280]). This section provides TLS-specific Requirements.

... Any endpoint receiving any certificate which it would need to validate using any signature algorithm using an MD5 hash MUST abort the handshake with a 'bad_certificate' alert. SHA-1 is deprecated."

RFC 8466, Section 4.4.3. Certificate Verify:

"The receiver of a CertificateVerify message MUST verify the signature field. The verification process takes as input:

The content covered by the digital signature;

The public key contained in the end-entity certificate found in the associated Certificate message;

The digital signature received in the signature field of the CertificateVerify; message.

If the verification fails, the receiver MUST terminate the handshake with a 'decrypt_error' alert.

... If sent by a client, the signature algorithm used in the signature MUST be one of those present in the supported_signature_algorithms field of the 'signature_algorithms' extension in the CertificateRequest message.

In addition, the signature algorithm MUST be compatible with the key in the sender's end-entity certificate. RSA signatures MUST use an RSASSA-PSS algorithm, regardless of whether RSASSA-PKCS1-v1_5 algorithms appear in 'signature_algorithms'. The SHA-1 algorithm MUST NOT be used in any signatures of CertificateVerify messages.

All SHA-1 signature algorithms in this specification are defined solely for use in legacy certificates and are not valid for CertificateVerify signatures."

RFC 8466, Section 4.4.4. Finished:

"Recipients of Finished messages MUST verify that the contents are correct and if incorrect MUST terminate the connection with a 'decrypt_error' alert."

RFC 8466, section 4.6.1. New Session Ticket Message:

"ticket_lifetime:

The value of zero indicates that the ticket should be discarded immediately. Clients MUST NOT cache tickets for longer than 7 days, regardless of the ticket_lifetime, and MAY delete tickets earlier based on local policy."

RFC 8466, Section 5.1. Record Layer:

"Handshake messages MUST NOT span key changes. Implementations MUST verify that all messages immediately preceding a key change align with a record boundary; if not, then they MUST terminate the connection with an 'unexpected_message' alert. Because the ClientHello, EndOfEarlyData, ServerHello, Finished, and KeyUpdate messages can immediately precede a key change, implementations MUST send these messages in alignment with a record boundary."

RFC 8466, Section 5.2. Record Payload Protection:

"If the decryption fails, the receiver MUST terminate the connection with a 'bad_record_mac' alert."

RFC 8466, Section 4.3.1. Encrypted Extensions:

"The EncryptedExtensions message contains extensions that can be protected, i.e., any which are not needed to establish the cryptographic context, but which are not associated with individual certificates. The client MUST check EncryptedExtensions for the presence of any forbidden extensions and if any are found MUST abort the handshake with an 'illegal_parameter' alert."

RFC 8466 4.4.2.3. Client Certificate Selection:

"If the CertificateRequest message contained a non-empty 'oid_filters' extension, the end-entity certificate MUST match the extension OIDs that are recognized by the client, as described in Section 4.2.5."

As can be seen in these example RFC messages and message requirements, there are many validations, verifications and checks that are required to be performed by an entity, such as the client 210 and the server 220. The technology disclosed bypasses or transitions past these required validations, verifications and checks in order to optimize the setting up of secure communication sessions.

Now, turning back to operation 303 of FIG. 3A, an invalid key or server key is transmitted from the server 220 to the client 210. The client 210 then receives the invalid key, but bypasses the verification of the invalid key in operation 304 and behaves as if there has been a successful verification. Operation 304 is similar to operation 302, except that client bypasses the verification of the key in operation 304 as opposed to bypassing the validation of the invalid certificate in operation 302. Operation 244 is the same as described above with reference to FIG. 2.

In operation 305 the client 210 transmits an invalid key or client key to the server 220. After receiving the invalid key from the client 210, the server bypasses the verification of the invalid key transmitted from the client 210. Operations 247, 247, 248, 249, 250 and 251 are the same as those described above with reference to FIG. 2. In the testing environment for testing the DUT 230, 1,000 or more secure communication sessions can be established in order to test the DUT 230. The operations described in FIG. 3A, as well as in FIGS. 2, 3B and 3C only describe the establishing of a single session, but the type of testing environment described herein typically establishes 1,000 or more secure communication sessions. The maximum number of communication sessions is only limited according to the capabilities of the client 210, the server 220 and the DUT 230, where 10,000,000 secure communication sessions is not outside the realm of current testing capabilities. As such, the bypassing of validation, verification and checking in each of these sessions provides significant increase in speed and reduction in compute costs.

Aside from the bypassing described in operations 302, 304 and 306, the technology disclosed can also bypass or transition past the sending of an error message or the termination of a secure communication session if an error has occurred at either the client 210 or the server 220. In the testing environment, certain errors can be ignored, even if contrary to the standards-required by the particular protocol used to establish the secure communication session. Furthermore, the server 220 and the client 210 can also bypass a hash. Specifically, when the standards-required verification or validation is the verification of a hash by either the client 210 or the server 220, the server 220 or the client 210 can transition past the verification without actually verifying the hash or using the hash to make some other type of verification. The server 220 or the client 210 can simply continue to operate as if the hash were verified or used to make some other type of verification. In addition to certificates, keys and hashed, the technology disclosed can implement these optimization techniques on other items, such as verifications of digital signatures of content or any other items of which the standard-based communications require verification, validation, checking, etc. The above-described verifications, validations and checking can be requirements of specific standard-based procedures that are utilized to conduct the secure communication.

Other examples of bypassing or transition past verification, validations or checks include: (i) skipping public key signature verification, such that when the client 210 receives the public key from the server 220, the client 210 does not verify the signature both RSA and non-RSA, because this verification of the public key signature is expensive especially when implemented as non-blocking call, and (ii) skipping key Hashing for Message Authentication Code (HMAC) verification to improves tunnel per second performance for IPSec, for both client 210 and server 220 (key HMAC verification is a mandatory integrity check for a normal IPSec entity, but in the testing environment the technology disclosed skips verifying the MAC for the IKEv2 handshake messages, which is equivalent to setting an integrity algorithm to 'none' which is not recommended for a real product or outside of the testing environment.

Figure 3B:
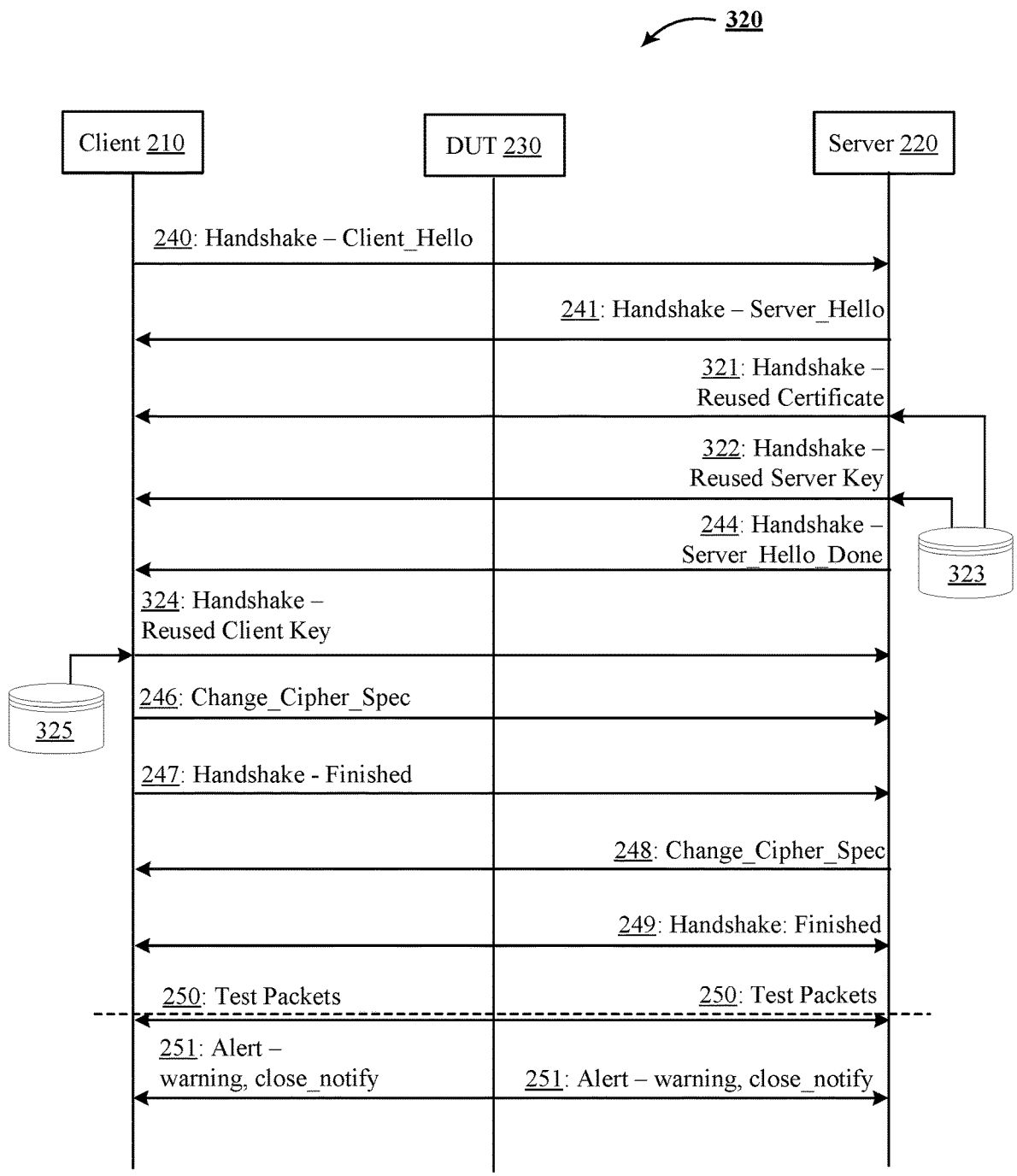
FIG. 3B illustrates a message flow (between a client and a server, and through a DUT) that reuses standards-required security mechanisms according to an embodiment of the present disclosure.

FIG. 3B illustrates a message flow (between a client and a server, and through a DUT) in which the client and server generate and transmit content contrary to an established standard-based protocol that poses certain requirements of the content according to an embodiment of the present disclosure. Referring to FIG. 3B, a data flow 320 between a client 210, a DUT 230 and a server 220 is illustrated. Operations 240, 241, 244, 246, 247, 248, 249, 250 and 251 of FIG. 3B are the same as those described above with reference to FIG. 2. Therefore, redundant descriptions thereof are omitted.

Before discussing the various operations that are used to implement the optimization techniques illustrated in FIG. 3B, example RFC message requirements are provided below that can be optimized using these techniques. Similar to the RFC examples described above regarding FIG. 3A, these are merely non-limiting examples taken from RFC 8466.

RFC 8466, Section 4.4.2.3. Client Certificate Selection:

"If the CertificateRequest message contained a non-empty 'oid_filters' extension, the end-entity certificate MUST match the extension OIDs that are recognized by the client, as described in Section 4.2.5."

RFC 8466, Section 4.4.3. Certificate Verify:

"If sent by a client, the signature algorithm used in the signature MUST be one of those present in the supported_signature_algorithms field of the 'signature_algorithms' extension in the CertificateRequest message.

In addition, the signature algorithm MUST be compatible with the key in the sender's end-entity certificate. RSA signatures MUST use an RSASSA-PSS algorithm, regardless of whether RSASSA-PKCS1-v1_5 algorithms appear in 'signature_algorithms'. The SHA-1 algorithm MUST NOT be used in any signatures of CertificateVerify messages.

All SHA-1 signature algorithms in this specification are defined solely for use in legacy certificates and are not valid for CertificateVerify signatures."

RFC 8466, Section 4.2.11.1. Ticket Age:

"The client's view of the age of a ticket is the time since the receipt of the NewSessionTicket message. Clients MUST NOT attempt to use tickets which have ages greater than the 'ticket_lifetime' value which was provided with the ticket."

RFC 8466, Section 4.2.9. Pre-Shared Key Exchange Modes:

"A client MUST provide a 'psk_key_exchange_modes' extension if it offers a 'pre_shared_key' extension. If clients offer 'pre_shared_key' without a 'psk_key_exchange_modes' extension, servers MUST abort the handshake. Servers MUST NOT select a key exchange mode that is not listed by the client."

RFC 8466, Section 5.3. Per-Record Nonce:

"A 64-bit sequence number is maintained separately for reading and writing records. The appropriate sequence number is incremented by one after reading or writing each record. Each sequence number is set to zero at the beginning of a connection and whenever the key is changed; the first record transmitted under a particular traffic key MUST use sequence number 0.

Because the size of sequence numbers is 64-bit, they should not wrap. If a TLS implementation would need to wrap a sequence number, it MUST either rekey (Section 4.6.3) or terminate the connection."

RFC 8466, Section 4.6.1. New Session Ticket Message:

"'ticket_age_add': A securely generated, random 32-bit value that is used to obscure the age of the ticket that the client includes in the 'pre_shared_key' extension. The client-side ticket age is added to this value modulo $2^{32}$ to obtain the value that is transmitted by the client. The server MUST generate a fresh value for each ticket it sends."

RFC 8466, Section 4.1.3. Server Hello:

"random: 32 bytes generated by a secure random number generator. See Appendix C for additional information. The last 8 bytes MUST be overwritten as described below if negotiating TLS 1.2 or TLS 1.1, but the remaining bytes MUST be random. This structure is generated by the server and MUST be generated independently of the ClientHello.random."

RFC 8466, section Certificate Request:

certificate_request_context: An opaque string which identifies the certificate request and which will be echoed in the client's Certificate message. The certificate_request_context MUST be unique within the scope of this connection (thus preventing replay of client CertificateVerify messages).

RFC 8466, Section 6. Alert Protocol:

Error alerts indicate abortive closure of the connection (see Section 6.2). Upon receiving an error alert, the TLS implementation SHOULD indicate an error to the application and MUST NOT allow any further data to be sent or received on the connection. Servers and clients MUST forget the secret values and keys established in failed connections, with the exception of the PSKs associated with session tickets, which SHOULD be discarded if possible.

Turning to FIG. 3B, when establishing a secure communication, the client 210 and the server 220 reuse standards-required security mechanisms, as opposed to generating or obtaining new security mechanisms when called for by a standard-based procedure of the secure communication session. Standards include any of the RFCs and similar documents established by standards setting organizations (SSOs). It also can include corporate standard that an organization adopts for its own use. Security mechanisms include security devices such as, but not limited to certificates, keys, tickets, exchange requirements, hashes and anything else that can be implemented to establish and continue the use of a secure communication session.

In operation 321 the server 220 reuses a certificate from a pool of security mechanisms 323 and in operation 322 the server 220 reuses a server key from the pool of security mechanisms 323. The pool of security mechanisms 323 is merely an example, which can include various repositories of different types of security mechanisms residing at different locations. Furthermore, the pool of security mechanisms 323 may retain just a single certificate, key, etc., so that the server 220 can repeatedly reuse the same certificate, key, etc. Depending on the DUT 230, it may be necessary to have a certain number of certificates, keys, etc., for reuse, so that the DUT 230 does not notice or is not impacted by the reuse of these items.

The reuse of these security mechanisms can be contrary to a standard-based procedure of the secure communication session. However, this does not impact the test, because the client 210 that receives the reused security mechanism can bypass the verification of the security mechanism as discussed above with reference to FIG. 3A.

In operation 324 the client 210 obtains and transmits a reused key from another pool of security mechanisms 325. The pool of security mechanisms 325 can be the same as or separate from the pool of security mechanisms 323 accessed by the server 220.

Some other types of certificates that can be reused include elliptic-curve cryptography (ECC) keys, a wildcard certificate that covers all subdomains of a top-level domain and a wildcard certificate that covers all top-level domains, where both types of wildcard certificates would be unusable or non-compliant according to a standard-based procedure utilized to conduct the secure communication. Another form of optimization that can be implemented in this testing environment is to ignore or bypass any requirements by the standard-based procedure to discard a security mechanism after its use or after a specific duration of time, or any other factor, as well as bypass any requirements for the creation of a new security mechanism or the implementation of a security mechanism having different values from a previously used or implemented security mechanism.

Additional specific examples of pooling include (i) key pooling for IPSec in order to improve tunnels per second performance for IPSec, which works in the similar way as ECC key pooling, except that the DH public and private keys used in the Ikev2 handshake key exchange are pooled (e.g., 10,000 keys can be pooled), and (i) client side key share pooling for TLS 1.3, which works in a similar way as ECC key pooling (note for TLS 1.2 this can be done using the "keyshare" field in the client hello message, this works based on an assumption that a same supported group selected on both client and server side exists, and if a HelloRetryRequest is sent, this will fail and hence needs to be disabled).

Additionally, the server 220 or the client 210 can implement different exchange modes than required by the standard-based procedure, transmitting non-unique standards-required security mechanism requests when the standard-based procedure of the secure communication session requires a unique standards-required security mechanism. Moreover, security mechanisms exchanged between the client 210 and the server 220 can include falsified or invalid security mechanisms, such as certificates, keys and hashes. If the standard-based procedure of the secure communication requires a particular level of security strength of the security mechanism the server 220 and the client 210 may obtain or generate security mechanisms having a lower level of security strength that what is required.

Figure 3C:
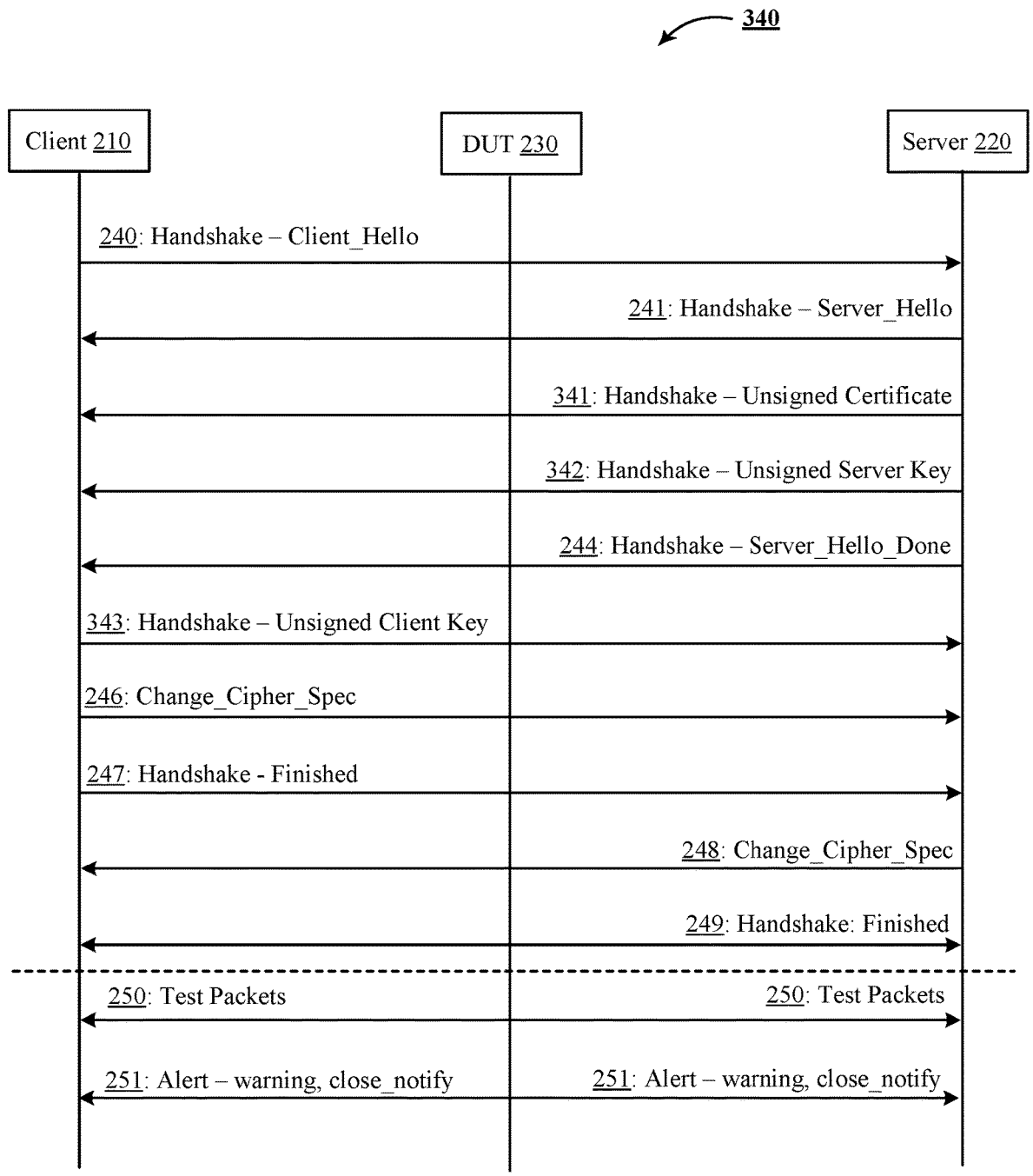
FIG. 3C illustrates a message flow (between a client and a server, and through a DUT) in which the client and server generate and transmit content contrary to an established standard-based protocol that poses certain requirements of the content according to an embodiment of the present disclosure.

FIG. 3C illustrates a message flow (between a client and a server, and through a DUT) in which the client and server generate and transmit content contrary to an established standard-based protocol that poses certain requirements of the content according to an embodiment of the present disclosure. Referring to FIG. 3C, a data flow 300 between a client 210, a DUT 230 and a server 220 is illustrated. Operations 240, 244, 246, 247, 248, 249, 250 and 251 of FIG. 3C are the same as those described above with reference to FIG. 2. Therefore, redundant descriptions thereof are omitted.

Before discussing the various operations that are used to implement the optimization techniques illustrated in FIG. 3C, example RFC message requirements are provided below that can be optimized using these techniques. Similar to the RFC examples described above regarding FIGS. 3A and 3B, these are merely non-limiting examples taken from RFC 8466.

RFC 8466, Section 4.4.4. Finished:

"Any records following a Finished message MUST be encrypted under the appropriate application traffic key as described in Section 7.2. In particular, this includes any alerts sent by the server in response to client Certificate and CertificateVerify messages."

RFC 8466, Section 5.1. Record Layer:

"When record protection has not yet been engaged, TLSPlaintext structures are written directly onto the wire. Once record protection has started, TLSPlaintext records are protected and sent as described in the following section. Note that Application Data records MUST NOT be written to the wire unprotected."

Turning to FIG. 3C, the server 220 and the client 210 establish a secure communication session by generating and transmitting content that is contrary to an established standard-based procedure that poses certain requirements of the content. For example, a requirement of the standard-based procedure could be that content is encrypted or encrypted to a certain level and another requirement could be that the content must be signed. Content can be any information that is transmitted between the client 210 and the server 220, such as headers, payloads, etc. In operation 341 the server 220 transmits an unsigned certificate to the client 210 and in operation 342 the server 220 transmits a key that is unsigned. Similarly, in operation 343 the client 210 transmits an unsigned key to the server 220. Combining these optimization techniques with the techniques described with reference to FIGS. 3A and 3B allows for the client 210 and or sever 220 to (i) bypass the verification of any unsigned or unencrypted or improperly signed or encrypted content that should be signed or encrypted and (ii) reuse unsigned certificates and keys or encrypted content that should be signed or encrypted.

Figure 4:
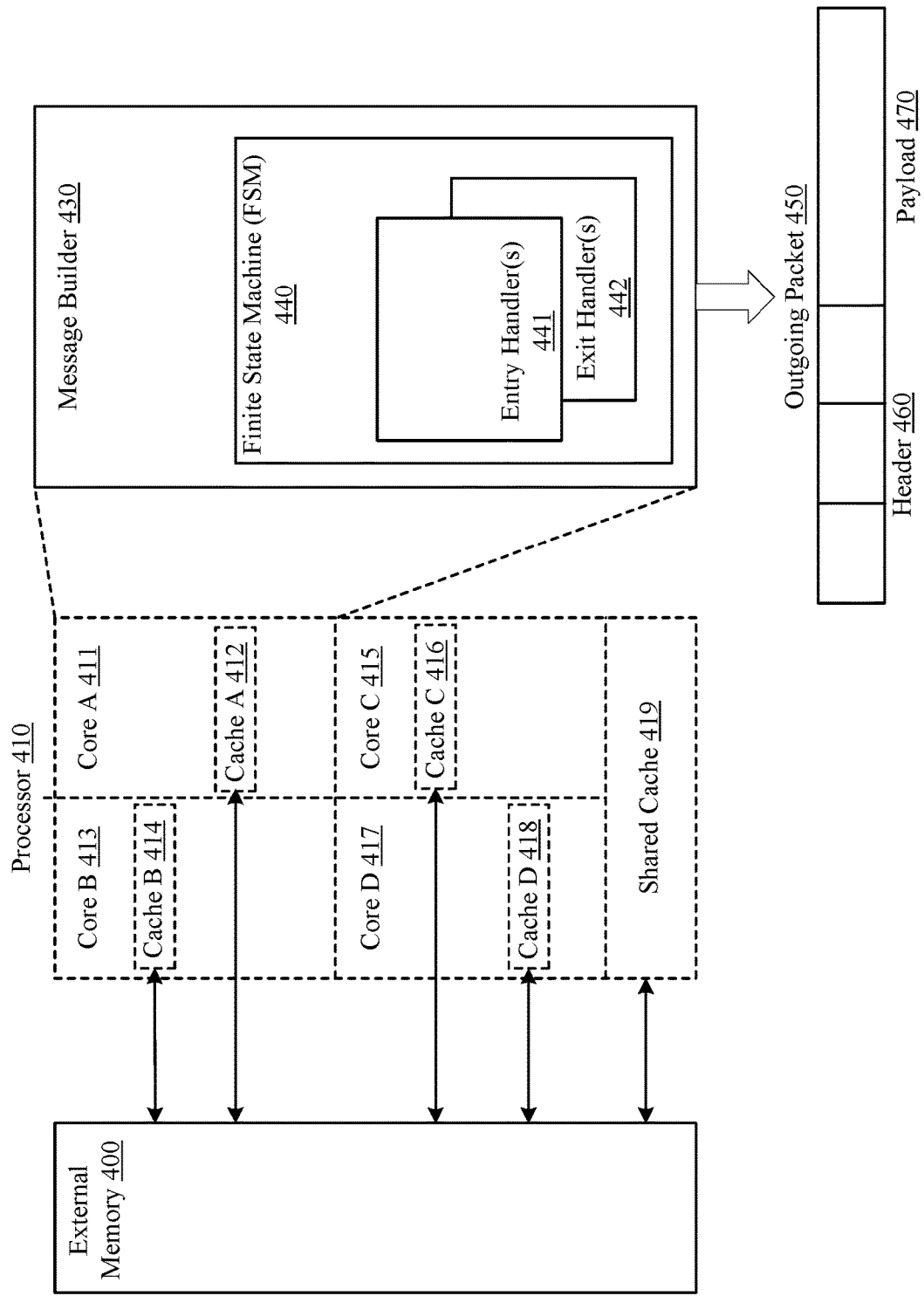
FIG. 4 illustrates a block diagram of a portion of a client machine or a server machine that generates and transmits test packets according to an embodiment of the present disclosure.

FIG. 4 illustrates a block diagram of a portion of a client machine or a server machine that generates and transmits test packets according to an embodiment of the present disclosure. Referring to FIG. 4, an external memory 400, a processor 410 and a message builder 430 are illustrated. The external memory 400 and the processor 410 are physical components and the message builder 430 is all or at least partially software that is running of the processor 410.

Further, the external memory 400, the processor 410 and the message builder 430 reside on the client machine 110 and/or the server machine 120, as illustrated in FIG. 1.

The external memory 400 is memory that is external to the processor 410 and can be random access memory (RAM), solid state memory (SSD) or the like.

The processor 410 can include a single core or multiple cores. As discussed in this disclosure, in an implementation four or more cores can be used for each client machine 110 and each server machine 120 due to the high volume of throughput necessary to effectively stress the DUT 130. However, the same concept applies regardless of whether one, two or four or more cores are used. FIG. 4 illustrates that the processor 410 includes Core A 411, Core B 413, Core C 415 and Core D 417. As illustrated in FIG. 4, each core can have its own (on-processor) cache. Core A 411 includes (on-processor) Cache A 412, Core B 413 includes (on-processor) Cache B 414, Core C 415 includes (on-processor) Cache C 416 and Core D 417 includes (on-processor) Cache D 418. Using caching terminology, Caches A, B, C and D (412, 414, 416 and 418) are level 1 or L1 cache, that is local to their respective cores. Processor 410 also includes a shared cache 419, which can be considered level 2 or L2 cache, which could be on-processor or off-processor cache. Level 3 or L3 cache may also be present in the system. The shared cache 419 can be shared between all 4 cores (i.e., Core A 411, Core B 413, Core C 415 and Core D 417). Further, the shared cache 419 can include multiple caches. For example, a first cache of the shared cache 419 can be designated to be shared between two cores, a second cache of the shared cache 419 can be designated between the other two cores and a third cache of the shared cache 419 can be shared between all four cores. Additionally, as previously described, the processor 410 can include more than four cores and there can be multiple processors 410 on the client machine 110 and/or the server machine 120.

Hereinafter, the term "Caches" refers to one or more of Cache A 412, Cache B 414, Cache C 416, Cache D 418 and the shared cache 419 (and all of the potential sub-caches thereof). In order to efficiently emulate thousands or millions of client/server secure communication sessions and exchange data between the servers and clients at a rate that will stress the DUT 130, the Caches can be utilized to fetch the data necessary for performing operations 240 through 251, as illustrated in FIGS. 2-3C, from the external memory 400 or from other sources. As illustrated in FIG. 4, the Caches are capable of fetching data from the external memory 400. While it is not illustrated, each of the Caches may also be able to exchange data therebetween. FIG. 4 is only a high-level block diagram and does not illustrate each of the possible bus connections and data exchanges between the various elements illustrated therein.

By using fetched data it is possible for the code or codebase that is needed by the processor 410 to remain in the Caches. As a result, there will not be a need to generate a new payload for every data exchange. This can also apply to any information exchanged between the server 220 and the client 210, such as certificates, keys, tickets, signed content, unsigned content, encrypted content, unencrypted content, messages, etc. The fetching makes it possible to get canned data or messages from the external memory 400 or other sources, such that the canned data or messages can be used as any part of the messages exchanged between the server machine 120 and the client machine 110. C++ and other language extensions can be used by the software running on the server machine 120 and the client machine 110 to implement an efficient method for fetching the data for the Caches. Other types of extensions may also be used to implement the fetching. Alternatively, the payloads or other portions of the messages exchanged between the server machine 120 and the client machine 110 can come from the external memory 400 or other sources. However, such an implementation could be about 7 times (or more) slower that the fetching. The fetching will just require additional programming considerations up front. A person of ordinary skill in the art may understand that the type of data generation required for the first phase of the secure communication (see FIG. 2) can be referred to as flexible mode data generation and the type of data generation required for the second phase of the secure communication, as implemented by the present technology can be either flexible mode data generation (i.e., not fetching data into the Caches for data generation) or inflexible mode data generation (i.e., using fetching data, to place the appropriate data into the Caches). However, note that the optimization techniques described with reference to FIGS. 3A-3C can include the fetching of data, such as fetching certificates from the pool of security mechanisms 323. Again, the fetching of the data eliminates the need to take the time to access the external memory 400 or other sources. The necessary data can be fetched and queued into the Caches for fast processing by the processor 410 and output by the message builder 430.

Additionally, each of the cores is capable of executing software that builds the messages or packets to be exchanged. FIG. 4 illustrates that software executed on Core A 411 (i.e., the message builder 430) initiates a finite state machine (FSM) 440 and generates an outgoing packet 450 based on the state of the FSM 440. The message builder 430 is capable of implementing multiple FSMs 440, where each FSM can represent a single emulated server or a single emulated client. As outlined in this document, the client machine 110 or a coordinated group of client machines can be capable of emulating millions of clients and the server machine 120 can be capable of emulating hundreds, if not thousands or millions of servers, where each emulated client is capable of establishing multiple secure communication sessions and each emulated server is capable of establishing thousands, if not millions of secure communication sessions. Each FSM 440 includes one or more entry handlers 441 and one or more exit handlers 442. The entry handlers 441 handle the entry of a message and can cause a state of the FSM 440 to change and the exit handlers 442 handle the exit of a massage based on the new state of the FSM 440. The functionality and operations of the FSM 440 will be understood by a person who is skilled in the art of finite state machines. The basic operations of finite state machines are described in more detail below with reference to FIGS. 5, 6 and 7.

The message builder 430, using the fetched data from the Caches and using the entry and/or exit messages of the FSM 40, creates the outgoing packet 450. The outgoing packet 450 is created by generating address and header information that is intentionally not in conformance with or is intentionally in conformance with the secure communication standard and by combining patterned payload data to the generated address and packet header. As illustrated, the outgoing packet 450 can include a header 460 and the payload 470. Even though the packet 450 is transmitted using a secure communication session, such as HTTPS, the payload 470 is either not encrypted at all or is encrypted at a lower level than that which was negotiated between the client and the server. This same technique applies to the optimizations describe above with reference to FIGS. 3A-3C. The header 460 includes address and header information and the payload 470 can include unencrypted data that has no meaning or patterned data that can be used for further analysis and testing of the performance of the DUT 130 while the test is being performed. The outgoing packet 450 is transmitted by the client machine 110 to the DUT 130 and then to the server machine 120, or is transmitted by the server machine 120 to the DUT 130 and then to the client machine 110. As this process is being carried out for potentially millions of secure communication sessions, the results of the test are being compiled by the calibration and analysis tool 140 (see FIG. 1), or any other device as described above.

Figure 8:
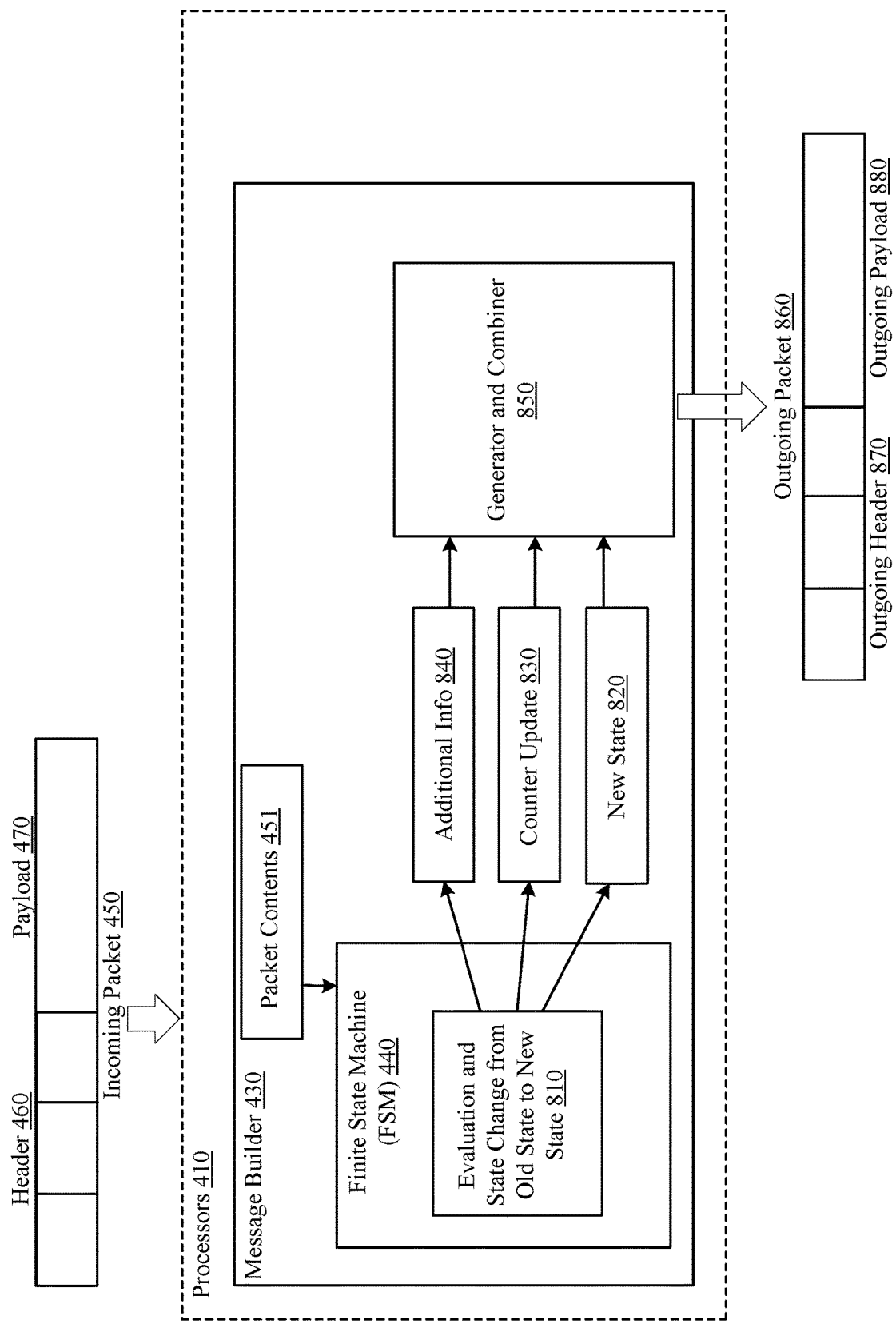
FIG. 8 illustrates a block diagram of a portion of client machine or a server machine that receives a test packet and generates an outgoing test packet in response.

FIG. 8 describes what happens during the test after the client machine 110 or the server machine 120 receives a packet. However, before this is described, finite state machines are described in further detail below.

Figure 5:
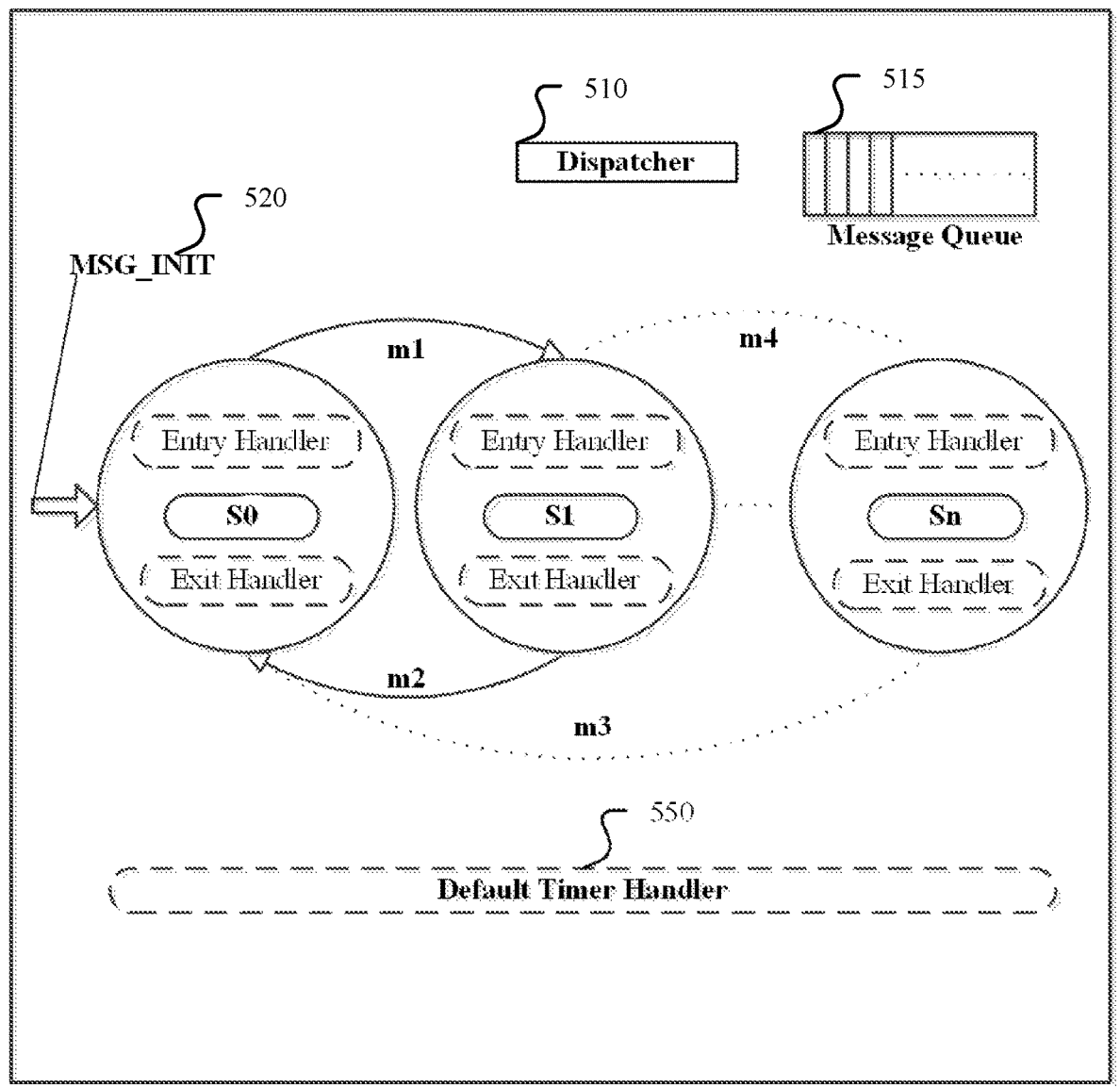
FIG. 5 illustrates a general framework of an example finite state machine (FSM) as utilized in FIG. 4 according to an embodiment of the present disclosure.

FIG. 5 illustrates a general framework of an example finite state machine (FSM) as utilized in FIG. 4 according to an embodiment of the present disclosure. Referring to FIG. 5, a general framework of an FSM 500 is illustrated. The FSM 500 can emulate, for example, a client or a server. As disclosed above, in order to test the handling of the secure communication sessions by the DUT, it is reasonable to emulate up to 5 million clients, each carrying out multiple secure communication sessions and it is reasonable to emulate hundreds of thousands of servers, each carrying out many secure communication sessions. This framework of the FSM 500 only refers to one finite state machine, but in view of the large number of client and servers emulated, the client machine 110 and the server machine 120 can be emulating millions of FSMs 500.

The FSM 500 has a number of states and behaviors that are modeled by exit, entry or/and timer handlers. In addition to the states, an FSM has a number of transitions that lets the FSM switch from a current state to a different state based on the input message. An FSM can use several components for message processing including a message queue 515 and dispatcher 510. The message queue enqueues incoming messages in a first in, first out (abbreviated FIFO) order. The dispatcher 510 dequeues the messages from the message queue in a FIFO manner to the current state and invokes the respective handlers for each state. If the entry, exit, and/or timer handlers are invoked and completed, the dispatcher checks the return Boolean value of these handlers. If the value is "False", this means that the FSM is still running and the dispatcher continues to dequeue and dispatch messages. However, if the return value is "True", the dispatcher stops dispatching any queued messages, and the FSM is considered to be complete.

Figure 6:
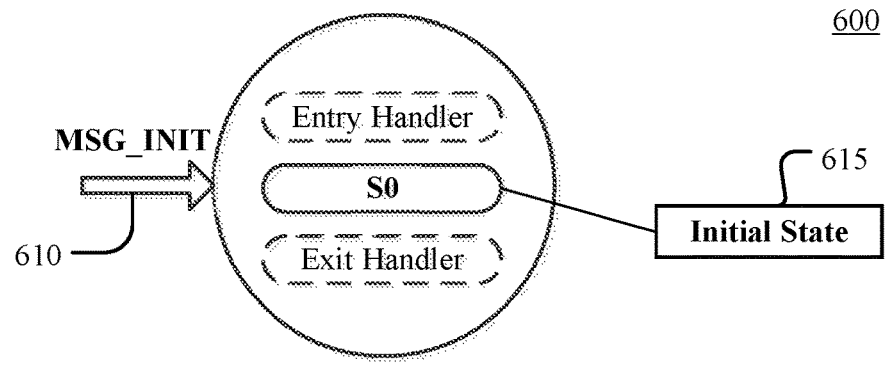
FIG. 6 illustrates a state-message duple of an FSM according to an embodiment of the present disclosure.

In the FSM 500, the MSG_INIT 520 is received by the initial state S0 that comprises of an exit handler and entry handler. The state S1 is an intermediate state, also comprising an exit handler and entry handler. The state Sn represents any other states that the FSM 500 may have along with its exit handler and entry handler. If the message is a timer expiry message, the default timer handler 550 is invoked FIG. 6 illustrates a state-message duple of an FSM according to an embodiment of the present disclosure. Referring to FIG. 6 a representation of example state-message duple of an FSM 600 is illustrated.

An FSM 600 can include a special state called the initial state 615, which the FSM 600 enters upon initialization or start-up. When the FSM 600 is initialized, a message called MSG_INIT 610 is enqueued into a message queue 515 and sent to the FSM 600. Upon receipt of this message, the system calls exit handler of the initial state, which contains the instructions for exiting the initial state.

Figure 7:
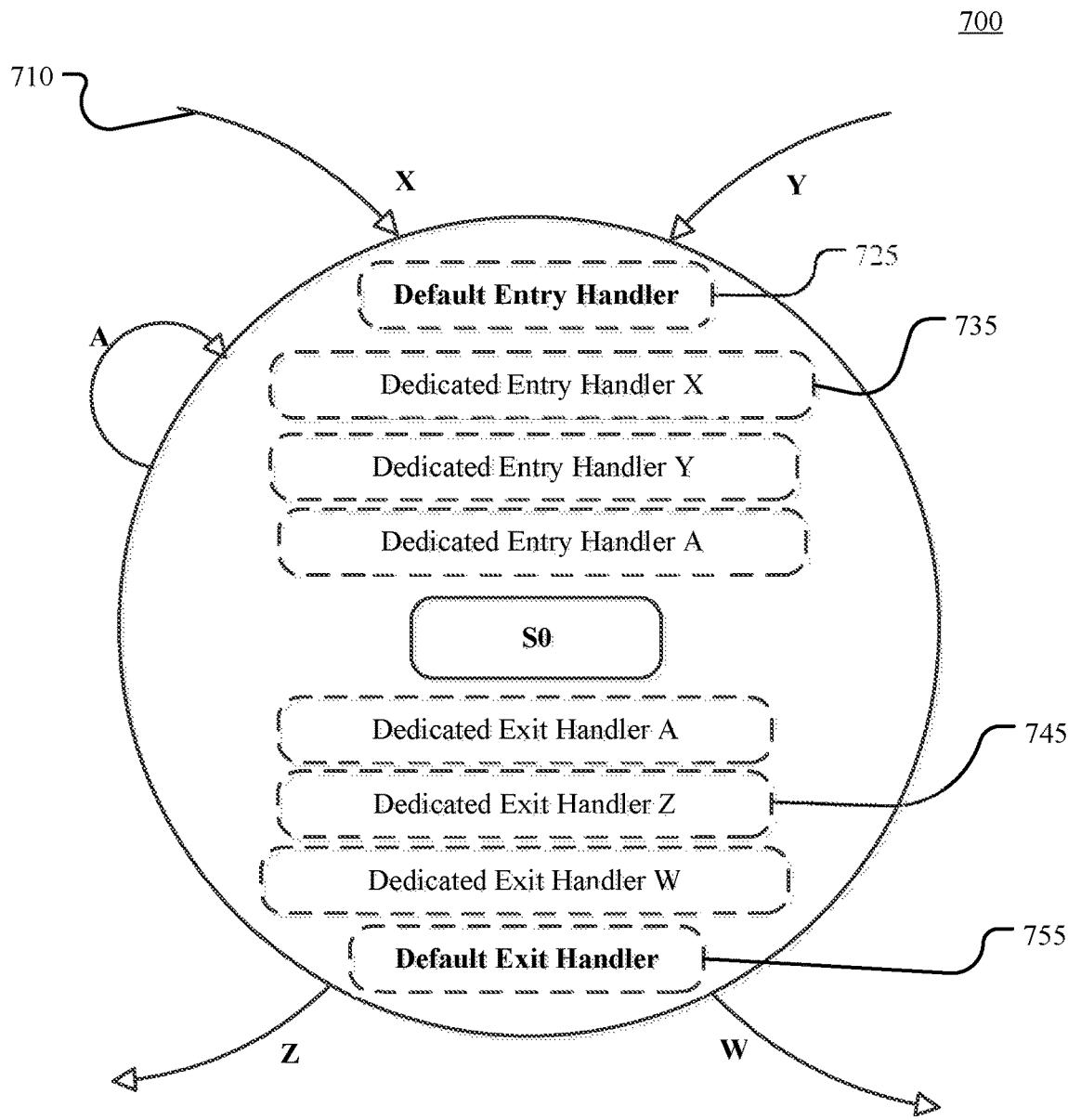
FIG. 7 illustrates default and dedicated handlers of an FSM and illustrates a state with self-transition of an FSM according to an embodiment of the present disclosure.

FIG. 7 illustrates default and dedicated handlers of an FSM and illustrates a state with self-transition of an FSM according to an embodiment of the present disclosure. Referring to FIG. 7, example dedicated handlers of an FSM 700 are illustrated.

These state handlers are used to process an incoming message 710, received while in a state and when exiting or entering it. One or more exit handlers and entry handlers model the behaviors related to the states of a FSM. The so-called default exit handler 755 or default entry handler 725 are methods, function-calls or similar blocks of code that contain instructions to describe and implement the state behaviors. Invoking these handlers serves to invoke the state behaviors. A state can also be modeled to handle specific messages by invoking either the so-called dedicated exit handler 745 or dedicated entry handler 735 or both. Messages X and Y cause a transition to enter the state; hence they only have a dedicated entry handler. Messages Z and W cause a transition to exit the state; hence they only have a dedicated exit handler.

FIG. 7 also illustrates a self-transition within a state, where message A is a self-transition that is responsive to another message and where message A has its own pair of dedicated exit and entry handlers.

FIG. 8 illustrates a block diagram of a portion of a client machine or a server machine that receives a packet and generates an outgoing packet in response. Referring to FIG. 8, a message builder 430 that receives an incoming packet 450 and builds and transmits an outgoing packet 860 is illustrated. The message builder 430 and the processor 410 executing the message builder 430 are described above with reference to FIG. 4. Therefore, redundant descriptions thereof are omitted here.

The incoming packet 450 includes a header 460 and a payload 470, which are described in more detail above. The incoming packet 450 is transmitted from the client machine 110 or the server machine 120, through the DUT 130, and is received here by the client machine 110 or the server machine 120. This packet 450 can be the same outgoing packet 450 that is described with reference to FIG. 4. Even though the incoming packet 450 is transmitted and received using a secure communication session, the payload 470 is either not encrypted at all or is encrypted at a lower level than that which was negotiated between the client and the server.

The message builder 430, which is emulating a client or a server using the FSM 440, receives the incoming packet 450 so that the FSM 440 can change its state based on information contained in the header 460 and/or the payload 470. As illustrated in FIG. 8, the FSM 440 performs an evaluation of the received incoming packet 450, such as packet contents 451 and performs a state change from an old state to a new state 810. Based on the new state, the FSM 440, using one or more exit handlers, outputs the new state 820 or a new state message, a counter update 830, and additional information 840. The counter update 830 can simply be an update of a counter that is keeping track of the number of test packets that have been received and the number of test packets that have been transmitted. The additional information 840 can be any information that would be beneficial to analyzing the performance of the DUT 130 during the test, as well as the performance of the client machine 110 and the server machine 120. Information from the new state 820, the counter update 830 and the additional information 840 can be received by a generator and combiner 850 that generates and combines the received information to generate the outgoing test packet 860 that includes an outgoing header 870 and an outgoing payload 880. The optimization concepts described above with reference to FIGS. 3A-3C can be implemented during the receipt of the incoming packet 450 and the generation of the outgoing packet 860.

The generator and combine 850 merely represents operations performed by the processor 410 (see FIG. 4) and other hardware and software components of the client machine 110 and/or server machine 120.

Figure 9:
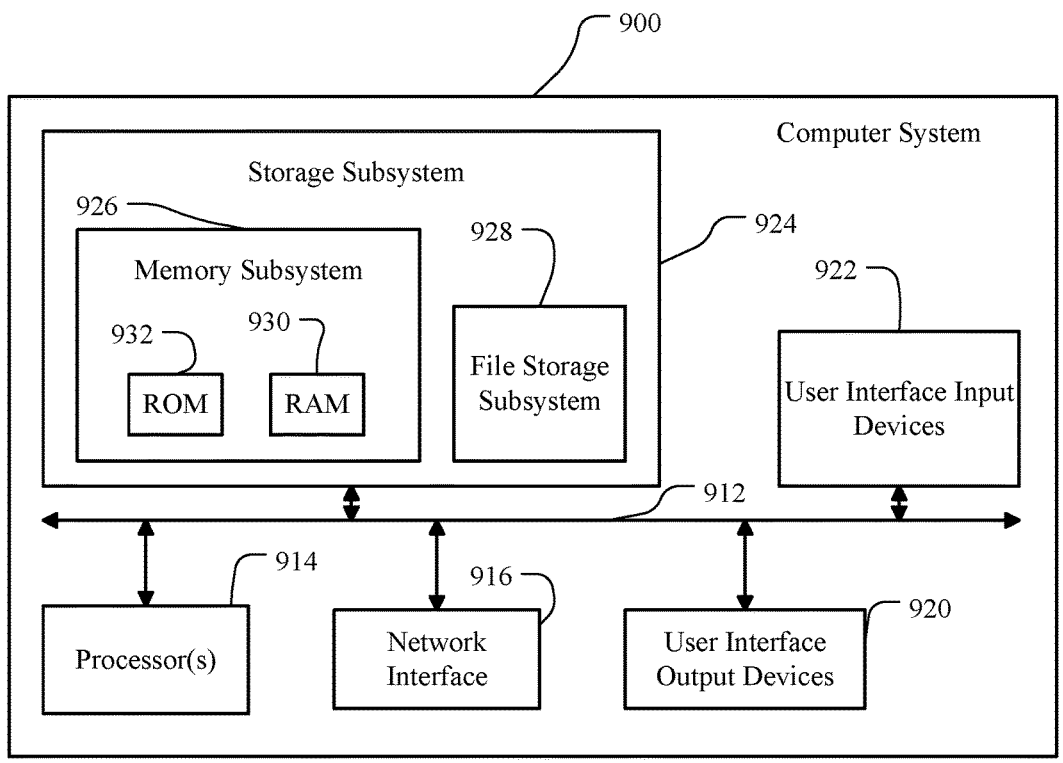
FIG. 9 illustrates a block diagram of an example computer system that implements a client state machine and/or a server state machine that performs a test on a DUT.

FIG. 9 illustrates a block diagram of an example computer system that implements a client state machine and/or a server state machine that performs a test on a DUT. Referring to FIG. 9, an example computer system 900 is illustrates. This example computer system 900 can perform the operations of the client machine 110, as illustrated in FIG. 1 and/or the operations of the server machine 120, as illustrated in FIG. 1. For example, first and second example computer systems 900 can be used to perform the operations of the client machine 110 and the server machine 120, respectively. Alternatively, one single example computer system 900 can perform the operations of the client machine 110, the server machine 120 and optionally the calibration and analysis tool 140, as illustrated in FIG. 1.

The computer system 900 can include one or more processors 914. If the computer system 900 is performing the operations of both the client machine 110 and the server machine 120, then the computer system 900 should have multiple processor cores. However, it can be possible to implement the present technology with a single processor core. As described with reference to FIG. 4 the processors 914 can include an individual cache for each core as well as a shared cache for the rapid generation and combination of data for creating the test packets. The processors 914 communicate with a number of peripheral devices via bus subsystem 912. These peripheral devices may include a storage subsystem 924 including, for example, a memory subsystem 926 and a file storage subsystem 928, user interface input devices 922, user interface output devices 920, and a network interface 916.

The user interface input and user interface output devices 920, 922 allow user interaction with computer system 900. Network interface 916 provides an interface to outside networks to communicate with other computer systems. The bus subsystem 912 also includes the ports necessary to communicate with the ports on the DUT and to interface with the calibration and analysis tool 140.

User interface input devices 922 may include: a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 900 to the user or to another machine or computer system.

Storage subsystem 924 stores programming and data constructs that provide the functionality of some or all of the modules and methods described herein. These software modules are generally executed by the processors 914 alone or in combination with other processors.

Memory subsystem 926 used in the storage subsystem can include a number of memories including a main random-access memory (RAM) 930 for storage of instructions and data during program execution and a read only memory (ROM) 932 in which fixed instructions are stored. The file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processors 914.

Bus subsystem 912 provides a mechanism for letting the various components and subsystems of the computer system 900 communicate with each other as intended. Although bus subsystem 912 is shown schematically as a single bus, alternative implementations of the bus subsystem may use multiple busses.

Computer system 900 can be of varying types including a workstation, server, computing cluster, blade server, server farm, or any other data processing system or computing device. Due to the ever-changing nature of computers and networks, the description of computer system 900 is intended only as one example. Many other configurations of the computer system 900 are possible having more or fewer components than the computer system depicted in FIG. 9.

Some Particular Implementations

We describe various implementations of testing handling of secure communication sessions of a plurality of clients with a plurality of servers by device or system under test (DUT), the testing conducted by a test system having at least first and second ports that are coupled to ports on the DUT.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed can include using a plurality of client state machines running one or more processor cores, communicating through the DUT with a plurality of server state machines running on one or more additional processor cores. Further, the method includes for each connection between (i) a client represented by a client state machine, of the plurality of client state machines, and (ii) a server represented by a server state machine, of the plurality of server state machines, setting up a secure communication session including: establishing a secure communication session, with a handshake between the client and the server including the client and/or the server transitioning past a standards-required verification step or validation step without performing the required verification or validation step. The method also includes following the setup of at least 500, 1,000, 5,000 or 50,000 secure communication sessions, conducting a test including: generating test packets; and transmitting the test packets through the DUT. Also, the method includes compiling and reporting results of the test.

In an embodiment, the establishing of the secure communication can include one of the client and the server bypassing a transmission of a standards-required error message to another of the client and the server when an error has occurred at the one of the client and the server.

In another embodiment, the standards-required verification step or validation step can be a verification of a certificate received by one of the client and the server, from the other of the client and the server, wherein the one of the client and the server receiving the certificate operates as if there has been a successful verification of the certificate without verifying the certificate.

In a further embodiment, the standards-required verification step or validation step can be a verification that a particular field (i) does correspond to a particular group and (ii) does not correspond to another particular group, wherein one of the client and the server transmits a standards-required message to another of the client and the server as if there has been a successful verification that the particular field (i) does correspond to the particular group and (ii) does not correspond to the other particular group.

In one embodiment, the standards-required verification step or validation step can be a validation of a key received by one of the client and the server, from the other of the client and the server, wherein the one of the client and the server receiving the key operates as if there has been a successful validation of the key without validating the key.

The standards-required verification step or validation step can be a verification of a hash received by one of the client and the server, from the other of the client and the server, wherein the one of the client and the server receiving the hash operates as if there has been a successful verification of the hash without verifying the hash.

In an embodiment, the standards-required verification step or validation step can be a verification of a digital signing of content received by one of the client and the server, from the other of the client and the server, wherein the one of the client and the server receiving the content operates as if there has been a successful verification of the digital signing of the content without verifying the digital signing of the content.

Another method implementation of the technology disclosed can include using a plurality of client state machines running one or more processor cores, communicating through the DUT with a plurality of server state machines running on one or more additional processor cores, and for each connection between (i) a client represented by a client state machine, of the plurality of client state machines, and (ii) a server represented by a server state machine, of the plurality of server state machines, setting up a secure communication session including: establishing a secure communication session, with a handshake between the client and the server, including the client and/or the server reusing standards-required security mechanisms without generating or obtaining new standards-required security mechanisms. The method can also include following the setup of at least 1,000 secure communication sessions, conducting a test including: generating test packets; and transmitting the test packets through the DUT. Also, the method may include compiling and reporting results of the test.

In an embodiment, one of the standards-required security mechanisms that is reused by the client or the server can be a reused certificate, where reuse of certificates is contrary to a standard-based procedure of the secure communication session. In a further embodiment, the reused certificate can be selected from a pool of reuseable certificates.

According to an additional embodiment 12 the reused certificate can be a wildcard certificate covering all subdomains of a top-level domain or a wildcard certificate covering all top-level domains, both types of wildcard certificates being unusable or non-compliant according to a standard-based procedure utilized to conduct the secure communication.

In another embodiment, one of the standards-required security mechanisms that is reused by the client or the server can be a reused key, where reuse of keys is contrary to a standard-based procedure of the secure communication session. Further, the reused key can be selected from a pool of reused certificates.

In a further embodiment, one of the standards-required security mechanisms that is reused by the client or the server can be a reused ticket, where reuse of tickets is contrary to a standard-based procedure of the secure communication session. Further, the reused ticket can be selected from a pool of reused tickets.

In a different embodiment reuse of the standards-required security mechanisms can be performed when a standard-based procedure of the secure communication session requires at least one of a discarding of the standards-required security mechanism, a creation of a new standards-required security mechanism, an implementation of a standards-required security mechanism having new values.

In an embodiment, the establishing of the secure communication session can include the server selecting an exchange mode of exchanging standards-required security mechanisms regardless of whether the exchange mode is listed by the client.

Further, in an embodiment the establishing of the secure communication session can include the server transmitting a non-unique standards-required security mechanism request when a standard-based procedure of the secure communication session requires a unique standards-required security mechanism request.

In an additional embodiment, the standards-required security mechanisms can be a requirement of a standard-based procedure utilized to conduct the secure communication. Further, one of the reused standards-required security mechanisms can be a falsified or invalid certificate, key or hash.

In another embodiment, the reused standards-required security mechanism can have a lower security strength than a security strength required by a standard-based procedure utilized to conduct the secure communication.

A further method implementation of the technology disclosed can include using a plurality of client state machines running one or more processor cores, communicating through the DUT with a plurality of server state machines running on one or more additional processor cores and for each connection between (i) a client represented by a client state machine, of the plurality of client state machines, and (ii) a server represented by a server state machine, of the plurality of server state machines, setting up a secure communication session including: establishing a secure communication session, including completing a handshake between the client and the server and the client and the server transmitting content contrary to an established standard-based procedure that poses certain requirements of the content. The method can further include following the setup of at least 1,000 secure communication sessions, conducting a test including: generating test packets; and transmitting the test packets through the DUT; and. Also, the method may include compiling and reporting results of the test.

In an embodiment, elements of the content generated and transmitted by the client and server can be unsigned or improperly signed, which is contrary to the established standard-based procedure that requires the elements of the content to be signed or properly signed.

In another embodiment the unsigned content is selected from a pool of unsigned content.

In a further embodiment the content generated and transmitted by the client and server is unencrypted content, non-standard encrypted content or transformed content, which is contrary to the established standard-based procedure that requires the content to be encrypted using a specific standard.

Other implementations may include a non-transitory computer readable recording medium storing instructions or a computer program executable by a processor to perform the methods as described above. Yet another implementation may include a system including memory and one or more processors operable to execute instructions, stored in the memory, to perform the methods as described above.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim:

1. A method of testing handling of secure communication sessions of a plurality of clients with a plurality of servers by device or system under test (DUT), the testing conducted by a test system having at least first and second ports that are coupled to ports on the DUT, the method including:
    using a plurality of client state machines running one or more processor cores, communicating through the DUT with a plurality of server state machines running on one or more additional processor cores;
    for each connection between (i) a client represented by a client state machine, of the plurality of client state machines, and (ii) a server represented by a server state machine, of the plurality of server state machines, setting up a secure communication session including:
        establishing a secure communication session, with a handshake between the client and the server, wherein standards associated with the secure communication session require a verification step or a validation step to be performed during the handshake and wherein the handshake includes the client and/or the server transitioning past the standards-required verification step or validation step without performing the required verification or validation step;
    using at least 1,000 of the established secure communication sessions, conducting a test including:
        generating test packets; and
        transmitting the test packets through the DUT; and
    compiling and reporting results of the test.

2. The method of claim 1, wherein the establishing of the secure communication session includes one of the client and the server bypassing a transmission of a standards-required error message to another of the client and the server when an error has occurred at the one of the client and the server with respect to a security mechanism related to the secure communication session.

3. The method of claim 1,
    wherein the standards-required verification step or validation step is a verification of a certificate received by one of the client and the server, from the other of the client and the server, and
    wherein the one of the client and the server receiving the certificate operates as if there has been a successful verification of the certificate without verifying the certificate.

4. The method of claim 1,
    wherein the standards-required verification step or validation step is a verification that a particular field (i) does correspond to a particular group and (ii) does not correspond to another particular group, and
    wherein one of the client and the server transmits a standards-required message to another of the client and the server as if there has been a successful verification that the particular field (i) does correspond to the particular group and (ii) does not correspond to the other particular group.

5. The method of claim 1,
    wherein, the standards-required verification step or validation step is a validation of a key received by one of the client and the server, from the other of the client and the server, and
    wherein the one of the client and the server receiving the key operates as if there has been a successful validation of the key without validating the key.

6. The method of claim 1,
    wherein, the standards-required verification step or validation step is a verification of a hash received by one of the client and the server, from the other of the client and the server, and
    wherein the one of the client and the server receiving the hash operates as if there has been a successful verification of the hash without verifying the hash.

7. The method of claim 1,
    wherein, the standards-required verification step or validation step is a verification of a digital signing of content received by one of the client and the server, from the other of the client and the server, and
    wherein the one of the client and the server receiving the content operates as if there has been a successful verification of the digital signing of the content without verifying the digital signing of the content.

8. A test system including one or more processors and non-transitory memory coupled to the processors, the non-transitory memory holding a computer program thereon, the computer program for testing handling of secure communication sessions of a plurality of clients with a plurality of servers by device or system under test (DUT), the test system further including at least first and second ports that couple the processors to ports on the DUT, the test system executing the computer program on the one or more processors to perform the method of claim 1.

9. A method of testing handling of secure communication sessions of a plurality of clients with a plurality of servers by device or system under test (DUT), the testing conducted by a test system having at least first and second ports that are coupled to ports on the DUT, the method including:
    using a plurality of client state machines running one or more processor cores, communicating through the DUT with a plurality of server state machines running on one or more additional processor cores;
    for each connection between (i) a client represented by a client state machine, of the plurality of client state machines, and (ii) a server represented by a server state machine, of the plurality of server state machines, setting up a secure communication session including:
    establishing a secure communication session, with a handshake between the client and the server, including the client and/or the server reusing standards-required security mechanisms without generating or obtaining new standards-required security mechanisms;
following the setup of at least 1,000 secure communication sessions, conducting a test including:
    generating test packets; and
    transmitting the test packets through the DUT; and
compiling and reporting results of the test.

10. The method of claim 9, wherein one of the standards-required security mechanisms that is reused by the client or the server is a reused certificate, where reuse of certificates is contrary to a standard-based procedure of the secure communication session.

11. The method of claim 9, wherein one of the standards-required security mechanisms that is reused by the client or the server is a reused key, where reuse of keys is contrary to a standard-based procedure of the secure communication session.

12. The method of claim 9, wherein one of the standards-required security mechanisms that is reused by the client or the server is a reused ticket, where reuse of tickets is contrary to a standard-based procedure of the secure communication session.

13. The method of claim 9, where reuse of the standards-required security mechanisms is performed when a standard-based procedure of the secure communication session requires at least one of a discarding of the standards-required security mechanism, a creation of a new standards-required security mechanism, an implementation of a standards-required security mechanism having new values.

14. The method of claim 9, wherein the establishing of the secure communication session includes the server selecting an exchange mode of exchanging standards-required security mechanisms regardless of whether the exchange mode is listed by the client.

15. The method of claim 9, wherein the establishing of the secure communication session includes the server transmitting a non-unique standards-required security mechanism request contrary to a standard-based procedure of the secure communication session that requires a unique standards-required security mechanism request.

16. The method of claim 9, wherein the standards-required security mechanisms are a requirement of a standard-based procedure utilized to conduct the secure communication session.

17. The method of claim 9, wherein one of the reused standards-required security mechanisms is an invalid certificate, key or hash.

18. The method of claim 9, further including the secure communication session using a security mechanism that has a lower security strength than a security strength required by a standard-based procedure utilized.

19. A test system including one or more processors and non-transitory memory coupled to the processors, the non-transitory memory holding a computer program thereon, the computer program for testing handling of secure communication sessions of a plurality of clients with a plurality of servers by device or system under test (DUT), the test system further including at least first and second ports that couple the processors to ports on the DUT, the test system executing the computer program on the one or more processors to perform the method of claim 9.

20. The method of claim 10, wherein the reused certificate is selected from a pool of reusable certificates.

21. The method of claim 10, wherein the reused certificate is a wildcard certificate covering all subdomains of a top-level domain or a wildcard certificate covering all top-level domains, both types of wildcard certificates being unusable or non-compliant according to a standard-based procedure utilized to conduct the secure communication session.

22. A method of testing handling of secure communication sessions of a plurality of clients with a plurality of servers by device or system under test (DUT), the testing conducted by a test system having at least first and second ports that are coupled to ports on the DUT, the method including:
    using a plurality of client state machines running one or more processor cores, communicating through the DUT with a plurality of server state machines running on one or more additional processor cores;
    for each connection between (i) a client represented by a client state machine, of the plurality of client state machines, and (ii) a server represented by a server state machine, of the plurality of server state machines, setting up a secure communication session including:
        establishing a secure communication session between the client and the server, including completing a handshake between the client and the server and the client and, during the handshake, the server transmitting content contrary to an established standard-based procedure that requires signing of the content; and
    following the setup of at least 1,000 secure communication sessions, conducting a test including:
        generating test packets; and
        transmitting the test packets through the DUT; and
    compiling and reporting results of the test.

23. The method of claim 22, wherein elements of the content generated and transmitted by the client and server are unsigned or improperly signed, which is contrary to the established standard-based procedure that requires the elements of the content to be signed or properly signed.

24. A test system including one or more processors and non-transitory memory coupled to the processors, the non-transitory memory holding a computer program thereon, the computer program for testing handling of secure communication sessions of a plurality of clients with a plurality of servers by device or system under test (DUT), the test system further including at least first and second ports that couple the processors to ports on the DUT, the test system executing the computer program on the one or more processors to perform the method of claim 22.

25. The method of claim 23, wherein the unsigned content is selected from a pool of unsigned content.

26. The method of claim 23, further including transmitting content contrary to an established-based procedure that requires encryption of the content.

* * * * *